US008605922B2

(12) United States Patent
Pulimi et al.

(10) Patent No.: US 8,605,922 B2
(45) Date of Patent: Dec. 10, 2013

(54) ANTENNA SYSTEM WITH PARASITIC ELEMENT FOR HEARING AID COMPLIANT ELECTROMAGNETIC EMISSION

(71) Applicant: Motorola Mobility LLC, Libertyville, IL (US)

(72) Inventors: Narendra Pulimi, Round Lake, IL (US); Hugh K. Smith, Palatine, IL (US); Istvan J. Szini, Grayslake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/910,063

(22) Filed: Jun. 4, 2013

(65) Prior Publication Data

US 2013/0273963 A1 Oct. 17, 2013

Related U.S. Application Data

(62) Division of application No. 12/818,288, filed on Jun. 18, 2010, now Pat. No. 8,483,415.

(51) Int. Cl.

| | |
|---|---|
| ***H01Q 1/24*** | (2006.01) |
| ***H01Q 1/38*** | (2006.01) |
| ***H01Q 1/48*** | (2006.01) |
| ***H01Q 9/04*** | (2006.01) |
| ***H01Q 19/00*** | (2006.01) |
| ***H04B 1/04*** | (2006.01) |

(52) U.S. Cl.
USPC .................... 381/312; 343/700 MS; 343/702; 343/833; 343/846; 455/129; 455/550.1; 455/575.7

(58) Field of Classification Search
USPC ......... 381/312; 455/575.7; 343/700 MS, 702, 343/833
See application file for complete search history.

(56) References Cited

U.S. PATENT DOCUMENTS 4,812,855 A * 3/1989 Coe et al. ...................... 343/818
5,568,155 A * 10/1996 Tsunekawa et al. ... 343/700 MS (Continued)

FOREIGN PATENT DOCUMENTS

EP 1432068 A2 * 6/2004
EP 1796207 A1 6/2007

(Continued)

OTHER PUBLICATIONS

Patent Cooperation Tready, "Notification of Transmittal of the International Search Report and the Written Opinion of the International Searching Authority, or the Declaration" for International Application No. PCT/US2011/036620, Sep. 1, 2011, 16 pages.

(Continued)

*Primary Examiner* — David Warren
*Assistant Examiner* — Christina Russell
(74) *Attorney, Agent, or Firm* — Daniel R. Collopy; Ingrassia Fisher & Lorenz, PC; Sylvia Chen

(57) ABSTRACT

A system for production of an electromagnetic (EM) field having EM emissions mitigated at one or more predetermined locations within a Hearing Aid Compliant (HAC) measurement plane is provided. The EM field mitigation system includes a ground plane, an antenna element, and a parasitic resonator element. The antenna element is coupled to the ground plane and resonates within at least one predetermined frequency band for transmitting and receiving the radio frequency (RF) signals modulated at one or more frequencies within the at least one predetermined first frequency band. The parasitic resonator element includes at least a half-wavelength resonator portion floating above the ground plane and a second half-wavelength resonator portion floating above the ground plane, crossing an effective electric field mid-line of the ground plane, and located a predetermined distance from the antenna element for mitigation of the EM emissions of the antenna element at the one or more predetermined locations within the HAC measurement plane.

14 Claims, 36 Drawing Sheets

(56) References Cited

U.S. PATENT DOCUMENTS

| | | | | |
|---|---|---|---|---|
| 6,456,249 | B1 * | 9/2002 | Johnson et al. | 343/702 |
| 6,781,556 | B2 * | 8/2004 | Kojima et al. | 343/818 |
| 6,906,667 | B1 * | 6/2005 | Poilasne et al. | 343/700 MS |
| 7,162,264 | B2 * | 1/2007 | Vance | 455/550.1 |
| 7,439,916 | B2 * | 10/2008 | Wang et al. | 343/700 MS |
| 7,486,245 | B2 * | 2/2009 | Park et al. | 343/702 |
| 2001/0021643 | A1 * | 9/2001 | Itoh | 455/90 |
| 2002/0061734 | A1 * | 5/2002 | Ito | 455/90 |
| 2002/0070902 | A1 * | 6/2002 | Johnson et al. | 343/702 |
| 2003/0151557 | A1 * | 8/2003 | Johnson | 343/702 |
| 2003/0210206 | A1 * | 11/2003 | Phillips et al. | 343/895 |
| 2004/0222923 | A1 * | 11/2004 | Erkocevic | 343/700 MS |
| 2004/0227672 | A1 * | 11/2004 | Chen et al. | 343/702 |
| 2005/0093750 | A1 * | 5/2005 | Vance | 343/702 |
| 2006/0258414 | A1 * | 11/2006 | Vance et al. | 455/575.7 |
| 2007/0252767 | A1 * | 11/2007 | Chiba et al. | 343/702 |
| 2008/0266188 | A1 * | 10/2008 | Imano et al. | 343/702 |
| 2009/0124306 | A1 * | 5/2009 | Kim et al. | 455/575.1 |
| 2009/0275370 | A1 * | 11/2009 | Schlub et al. | 455/575.7 |
| 2010/0026587 | A1 * | 2/2010 | Wang et al. | 343/700 MS |
| 2010/0033380 | A1 * | 2/2010 | Pascolini et al. | 343/700 MS |
| 2010/0265141 | A1 * | 10/2010 | Hsu | 343/702 |
| 2011/0012794 | A1 * | 1/2011 | Schlub et al. | 343/702 |
| 2011/0241948 | A1 * | 10/2011 | Bevelacqua et al. | 343/702 |

FOREIGN PATENT DOCUMENTS

| | | | | |
|---|---|---|---|---|
| JP | 2004260647 | A | * | 9/2004 |
| WO | 0133665 | A1 | | 5/2001 |
| WO | 02071536 | A1 | | 9/2002 |
| WO | WO 02071536 | A1 | * | 9/2002 |
| WO | 2008152180 | A1 | | 12/2008 |
| WO | WO 2008152180 | A1 | * | 12/2008 |
| WO | 2010065356 | A1 | | 6/2010 |
| WO | WO 2010065356 | A1 | * | 6/2010 |

OTHER PUBLICATIONS

United States Patent and Trademark Office, "Non-Final Rejection", for U.S. Appl. No. 12/818,288, Aug. 20, 2012, 11 pages.

United States Patent and Trademark Office, "Notice of Allowance and Fees Due", for U.S. Appl. No. 12/818,288, Mar. 7, 2013, 11 pages.

* cited by examiner

1000

2100

2400

ANTENNA SYSTEM WITH PARASITIC ELEMENT FOR HEARING AID COMPLIANT ELECTROMAGNETIC EMISSION

FIELD OF THE INVENTION

The present invention generally relates to radio frequency (RF) antenna systems, and more particularly relates to RF antenna systems for portable communication devices that include a parasitic element for hearing aid complaint electromagnetic emission.

BACKGROUND OF THE DISCLOSURE

The radio frequency (RF) transmissions of some portable communication devices, such as some cellular telephones, can interfere with a user's hearing aid. Such interference may cause an annoying and/or painful buzzing noise. In some countries, governmental design constraints have been or are being proposed for the RF transmissions of portable communication devices to exhibit a particular electric field and magnetic field behavior near an earpiece of the portable communication device to limit such interference.

In the United States, for example, the American National Standards Institute (ANSI) Accredited Standards Committee C63 on Electromagnetic Compatibility has defined standard ANSI C63.19 to establish compatibility between hearing aids and portable communication devices such as cellular telephones. ANSI C63.19 specifies that the RF transmissions of a portable communication device must have particular characteristics in the area of the portable communication device's earpiece (i.e., approximately where a person's hearing aid would be located during use with the communication device). More particularly, ANSI C63.19 specifies that the electric field and magnetic field generated by portable communication device RF transmissions be below certain thresholds proximate to the portable communication device's earpiece. While the electric field and magnetic field proximate to the portable communication device's earpiece can be reduced by an overall reduction in the RF transmission electric and magnetic fields, maintaining such reduced electric and magnetic fields significantly impacts the transmission and reception efficiency of the portable communication device.

Thus, there is an opportunity to develop an RF antenna system for a portable communication device that produces a limited electric field and magnetic field behavior near an earpiece thereof without significantly impacting the transmission and reception efficiency of the portable communication device. Furthermore, other desirable features and characteristics will become apparent from the subsequent detailed description and the appended claims, taken in conjunction with the accompanying drawings and this background of the disclosure.

BRIEF DESCRIPTION OF THE DRAWINGS

In the accompanying figures, reference numerals refer to identical or functionally similar elements throughout the separate views and together with the detailed description below are incorporated in and form part of the specification, and serve to illustrate various embodiments and to explain various principles and advantages in accordance with the present invention.

Figure 1A:
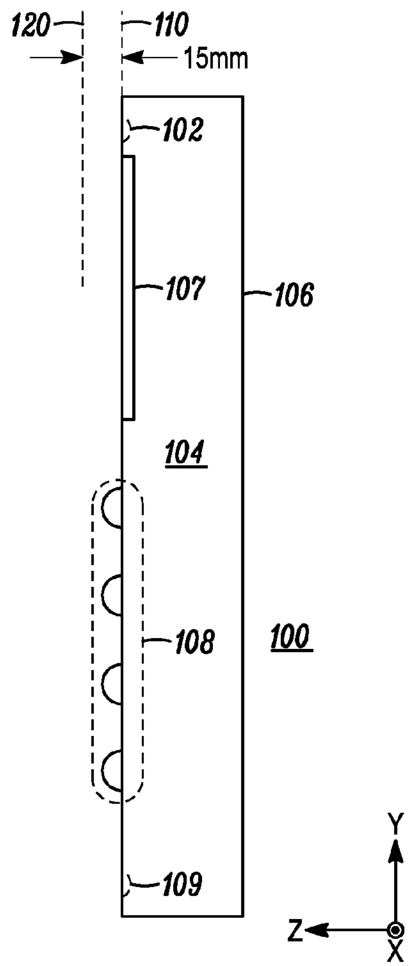
FIG. 1A is a right planar view of a conventional portable communication device depicting the spatial location of the American National Standards Institute (ANSI) C63.19 measurement plane above an earpiece speaker of the portable communication device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

Before describing in detail embodiments that are in accordance with the present invention, it should be observed that the embodiments reside primarily in combinations of apparatus components related to antenna systems. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A system for production of an electromagnetic (EM) field having EM emissions mitigated at one or more predetermined locations within a Hearing Aid Compliant (HAC) measurement plane (i.e., an EM field mitigation system) includes a ground plane, an antenna element, and a parasitic resonator element. The ground plane includes an effective electric field mid-line which laterally divides the ground plane into a first side and a second side. The antenna element is coupled to the ground plane and resonates within at least one predetermined frequency band to generate EM field emissions for transmitting and receiving radio frequency (RF) signals modulated at one or more frequencies within the at least one predetermined first frequency band. The parasitic resonator element is also coupled to the ground plane and is located a predetermined distance from the first antenna element. A first leg of the parasitic resonator element is connected to the first side of the ground plane and a second leg of the parasitic resonator element is connected to the second side of the ground plane.

Further, a portable communication device is provided for transmission and reception of RF signals. The portable electronic device includes an earpiece speaker, a printed circuit board (PCB), an antenna element, a parasitic resonator element, transceiver circuitry, and a controller. The earpiece speaker generates audio signals and provides the audio signals as audible output. The PCB provides interconnection for elements of the potable communication device; the PCB also establishes a ground plane for the portable electronic device. The antenna element is coupled to the ground plane and actively resonates within at least one predetermined frequency band for transmitting and receiving RF signals modulated at one or more frequencies within the at least one predetermined first frequency band. The parasitic resonator element has at least a first leg and a second leg connected to the ground plane on either lateral side of an effective electric field mid-line of the ground plane and is located a predetermined distance from the first antenna element. The parasitic antenna element creates additional resonance to mitigate electromagnetic emissions at locations in a Hearing Aid Compliant (HAC) measurement plane above the earpiece speaker. The transceiver circuitry is coupled to the antenna element and the ground plane of the PCB and includes transmitter circuitry for modulating signals for transmission from the antenna element as RF signals and receiver circuitry for demodulating RF signals received by the antenna element to generate demodulated signals. The controller is coupled to the transceiver circuitry for providing the signals to the transmitter circuitry for modulation and for receiving the demodulated signals from the receiver circuitry. The controller is also coupled to the earpiece speaker for providing signals to the earpiece speaker for generation of the audio signals to be provided from the earpiece speaker.

In addition, another portable communication device is provided for transmission and reception of RF signals. This portable communication device includes a ground plane and an electromagnetic (EM) field mitigation configuration. The EM field mitigation configuration includes an active antenna element and a passive parasitic resonator element. The active antenna element is coupled to the ground plane and resonates within at least one predetermined frequency band for transmitting and receiving RF signals modulated at one or more frequencies within the at least one predetermined first frequency band. The passive parasitic resonator element is also coupled to the ground plane. The passive parasitic resonator is located a predetermined distance from the first antenna element and mitigates a near-field resonant pattern of the antenna element above an earpiece speaker of the portable communication device without significantly affecting a far-field resonant pattern of the first antenna element.

This detailed description is merely exemplary in nature and is not intended to limit the invention or the application and uses of the invention. Furthermore, there is no intention to be bound by any theory presented in the preceding background of the disclosure or the detailed description.

Figure 1B:
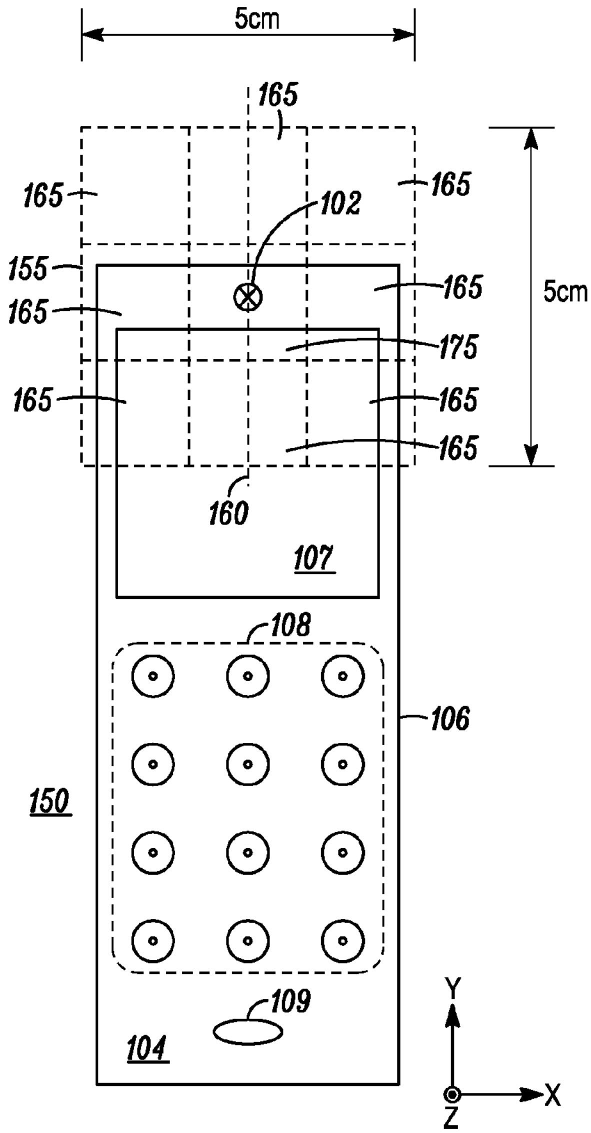
FIG. 1B is a front planar view of the conventional portable communication device of FIG. 1A with an overlay of the ANSI C63.19 measurement plane above the earpiece speaker of the portable communication device.

In the United States, the American National Standards Institute (ANSI) Accredited Standards Committee C63 on Electromagnetic Compatibility has defined standard ANSI C63.19 to establish compatibility between hearing aids and portable communication devices such as cellular telephones. ANSI C63.19 specifies that the electromagnetic (EM) emissions of a portable communication device, such as RF transmissions of the portable communication device, must have particular characteristics above the area of the portable communication device's earpiece (i.e., above the approximate area where a person's hearing aid would be located during use of the portable communication device). More particularly, ANSI C63.19 specifies that the electric field and magnetic field generated by portable communication device RF transmissions conform to certain characteristics at locations above the portable communication device's earpiece. Referring to FIGS. 1A and 1B, the specifications of ANSI C63.19 are graphically depicted, where FIG. 1A depicts a side planar view of a cellular phone and FIG. 1B depicts a front planar view of the cellular phone.

Referring to FIG. 1A, the side planar view 100 depicts an earpiece portion 102 of a cellular telephone 104 or other portable communication device having a housing 106. A display 107, keys of a keypad 108 and a microphone portion 109 of the cellular telephone 104 are also mounted on the housing 106. A reference plane 110 is depicted parallel to and over the earpiece portion 102. A plane 120 is defined fifteen millimeters above the reference plane 110 (i.e., above the earpiece portion 102 and along the z-axis as shown in FIG. 1A). Measurement of the electric field and magnetic field of RF transmissions of the cellular phone 104 are taken in the plane 120 to determine hearing aid compatibility in compliance with ANSI C63.19.

FIG. 1B depicts a front planar view 150 of the cellular phone 104 shown in FIG. 1A and a five centimeter by five centimeter measurement plane 155 in the plane 120 fifteen millimeters above the earpiece portion 102. The measurement plane 155 is centered over an earpiece speaker located behind a housing opening in the earpiece portion 102 such that a centerline 160 of the measurement plane 155 is located above a centerline of the earpiece portion 102. The measurement plane 155 is divided into nine compliance grids including eight outside compliance grids 165 and a center compliance grid 175. The compliance of the cellular telephone 104 is determined by measuring the electric and magnetic fields of the RF emissions in each of the compliance grids 165, 175 when the cellular telephone 104 is transmitting (i.e., the electric and magnetic fields of the RF transmissions). In accordance with the ANSI C63.19 standard measurement scheme, up to three exclusion grids are allowed for each of the electric field and the magnetic field measurements with the following restrictions: (1) the center compliance grid 175 is not excludable, (2) at least four of the six non-excluded grids for the electric field measurements should be common with the six non-excluded grids for the magnetic field measurements, and (3) each of the excluded grids should connect to another of the excluded grids. Thus, if at least six of the nine compliance grids 165, 175 as selected in accordance with the three HAC restrictions set out previously are in compliance for the electric field and magnetic field measurements, then the cellular telephone 104 is determined to be compliant with the ANSI C63.19 standard. Additionally, portable communication device manufacturers, such as wireless device manufacturers, can indicate in their labeling the compliance of a particular cellular telephone with the ANSI C63.19 standard. A 'M' rating number (e.g., 'M3', 'M4') appearing on a label of a wireless device refers to the wireless device's RF emissions level and means the device is intended for use with hearing aids in its microphone mode. The higher the 'M' rating number on the device, the more likely you will be able to use the device with a hearing aid, wherein 'M3" is a threshold for hearing aid compliance (i.e., wireless devices with a 'M1' or 'M2' rating not deemed sufficiently compliant for utilization with hearing aids.

Portable communication devices, such as cellular telephones, utilize antenna systems for receiving and transmitting radio frequency (RF) signals in various RF bands. Conventional dipole and loop antennas have minimum coupling onto the portable communication device's chassis and provide balanced RF driving. In the embodiments described herein, a differential dipole is adopted as the main radiator and has a current distribution on the ground plane which results in a concentration of the electrical field along the edges of the ground plane. This effect does not guarantee HAC compliance, however it can be used to achieve HAC compliance through perturbations which result in asymmetry of these fields and the use of HAC grid exclusion.

Figure 2:
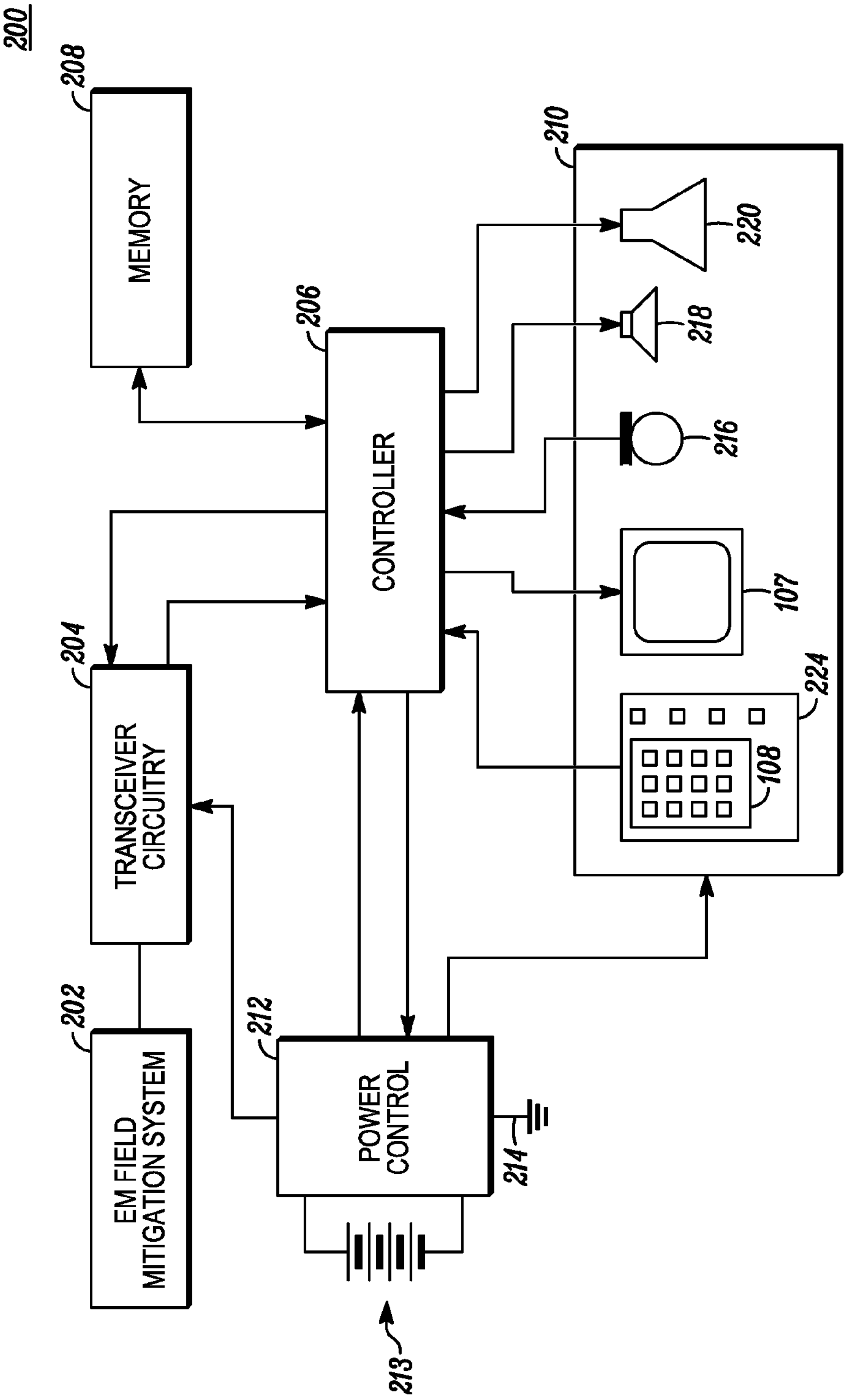
FIG. 2 is a block diagram of a portable communication device including an electromagnetic (EM) field mitigation system in accordance with embodiments.

Referring to FIG. 2, a block diagram depicts a portable communication device 200, such as a cellular telephone, in accordance with a first embodiment which utilizes an electromagnetic (EM) field mitigation system 202 including a differential driven active antenna that provides both a wide bandwidth response and hearing aid compliance by a unique current and field distribution. The active antenna of the EM field mitigation system 202 is utilized by the portable communication device 200 for receiving and transmitting radio frequency (RF) signals, such as cellular, WiFi, or WiMAX signals. Transceiver circuitry 204 includes receiver circuitry and transmitter circuitry in a manner familiar to those skilled in the art. The receiver circuitry demodulates and decodes the RF signals received by the active antenna of the EM field mitigation system 202 to derive information and is coupled to a controller 206 for use in accordance with the function(s) of the portable communication device 200. Although the portable communication device 200 is depicted as a cellular telephone, the portable communication device can be implemented as any communication device wherein an earpiece of the device is placed near a user's ear during one or more modes of operation of the portable communication device 200.

The controller 206 also provides information to the transmitter circuitry of the transceiver circuitry 204 for encoding and modulating information into RF signals for transmission from the active antenna of the EM field mitigation system 202. As is well-known in the art, the controller 206 is typically coupled to a memory device 208 and a user interface 210 to perform the functions of the portable communication device 200. Power control circuitry 212 is coupled to a battery 213 and generates and provides appropriate operational voltage and current to components of the portable communication device 200, such as the controller 206, the transceiver circuitry 204, and/or the user interface 210. In this embodiment, the user interface 210 includes a microphone 216, an earpiece speaker 218, a hands-free speaker 220, the display 107, and one or more key inputs 224, including, for example, the keypad 108.

In accordance with the present embodiment, the earpiece speaker 218 provides audio output for operation of the portable communication device 200 during typical operation. In accordance with the first embodiment, the EM field mitigation system 202 of the portable communication device 200 provides hearing aid compliant electromagnetic emissions during operation of the portable communication device 200.

Figure 3:
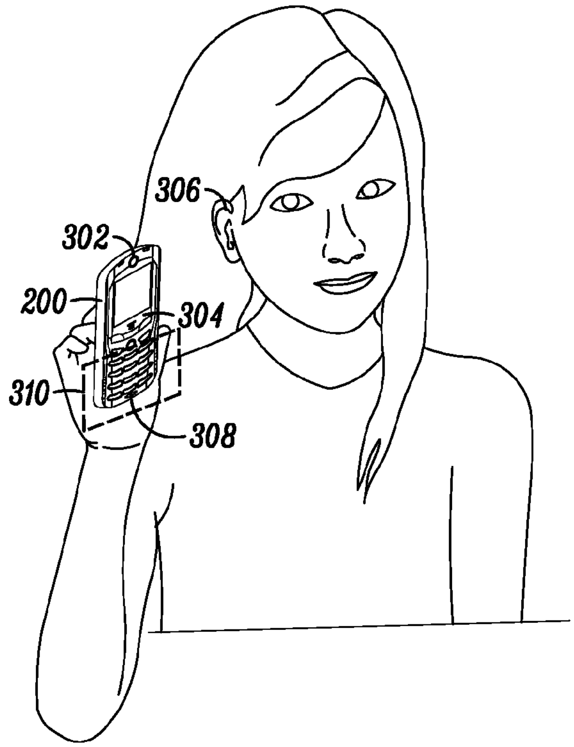
FIG. 3 is a front top right perspective view of a first portable communication device as held during utilization in accordance with the first embodiment.

Referring next to FIG. 3, orientation of the portable communication device 200 during typical operation places an opening 302 in a "candy bar" unhinged housing 304 of the portable communication device 200 proximate to a user's ear 306, and the opening 302 provides audio output from the earpiece speaker 218 located behind the opening 302 to the user's ear 306. Similarly, an opening 308 in the housing 304 provides a user's speech as audio input to the microphone 216 located behind the opening 308 located in a bottom portion 310 of the housing 304.

Figure 4:
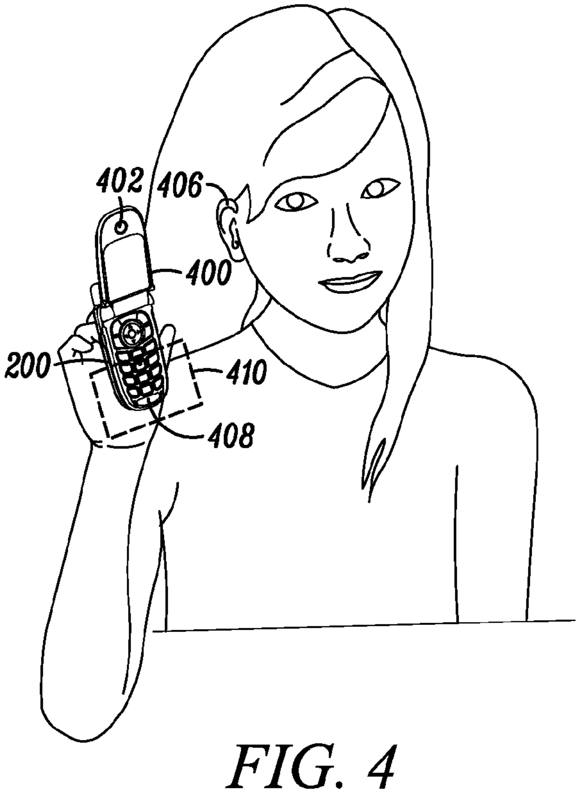
FIG. 4 is a front top right perspective view of a second portable communication device as held during utilization in accordance with the first embodiment.

Referring next to FIG. 4, orientation of the portable communication device 200 enclosed in a hinged "clamshell" housing 400 during typical operation places an opening 402 in the housing 400 proximate to a user's ear 406, and the opening 402 provides audio output from the earpiece speaker 218 located behind the opening 402 to the user's ear 406. In accordance with the first embodiment, the EM field mitigation system 202 located within the housing 400 also provides hearing aid compliant electromagnetic emissions during operation of the portable communication device 200. In addition, an opening 408 in the housing 400 provides a user's speech as audio input to the microphone 216 located behind the opening 408 in the bottom portion 410 of the housing 400.

While a primary antenna (i.e., an active antenna element) of the portable communication device 200 is located in a bottom portion 310, 410 of the housing 304, 400, the EM field mitigation system 202, which includes the active antenna element, must be able to mitigate the electromagnetic emissions proximate to the opening 302, 402 for the earpiece speaker 218 in order for the portable communication device 200 to be hearing aid compliant. There are three classes of design techniques utilizing an active antenna element that can be utilized to reduce the electromagnetic emissions of the active antenna element at a predetermined location distant from the active antenna element (i.e., proximate to the opening 302, 402 in the housing 304, 400). The first technique is an active cancellation technique which provides an active element at or near the predetermined location to disrupt the electromagnetic emissions generated by an active antenna element of the portable communication device 200. The second technique is an antenna system design technique wherein the reduced electromagnetic emissions are a result of the antenna design. The third technique is a chassis technique that provides a housing size and/or an EM field mitigation system that is determined in response to the active antenna element (i.e., where the housing size and/or a location of a parasitic resonator element of the EM field mitigation system is determined in response to the EM emissions of the active antenna element). The distance from the parasitic resonator element to the predetermined location is determined in response to the active antenna element's transmission wavelength and the distance of the parasitic resonator element from the active antenna element (e.g., one fourth of a wavelength) to provide mitigated electromagnetic emissions at the predetermined location.

Figure 5:
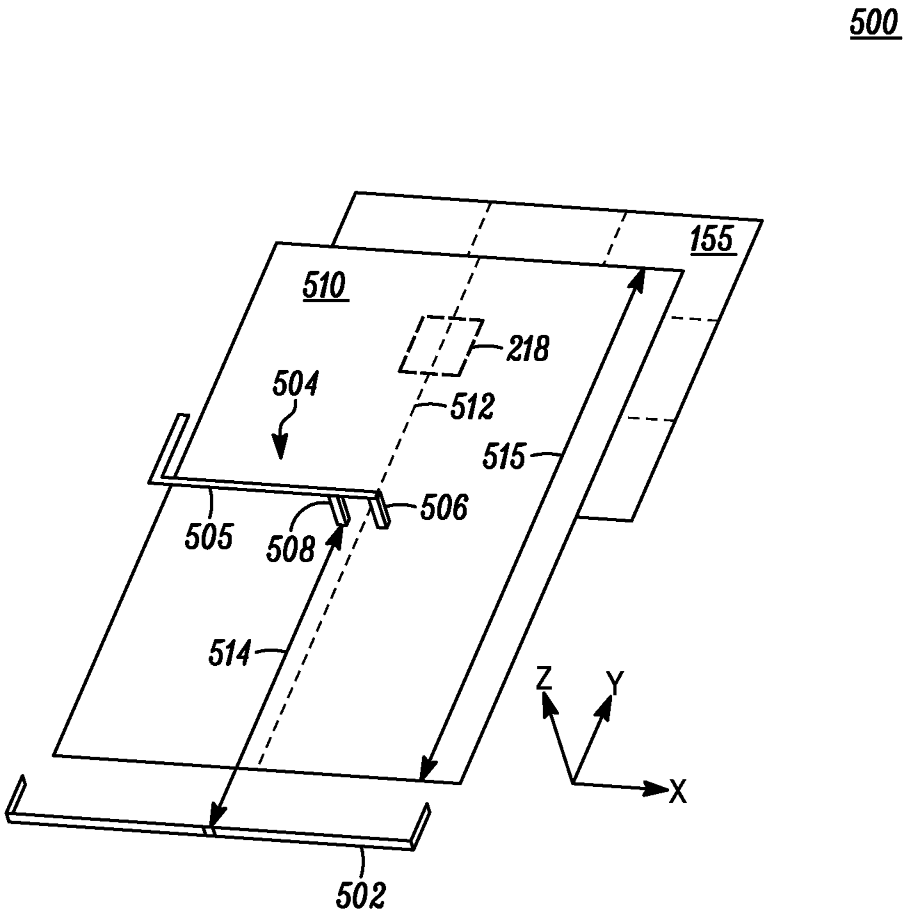
FIG. 5 is a rear bottom right perspective view of a portion of the inside structure of the portable communication device of FIG. 2 depicting the EM field mitigation system in accordance with the first embodiment.

Referring to FIG. 5, a rear bottom right perspective view 500 of the portable communication device 200 depicts the EM field mitigation system 202 in accordance with a first embodiment which utilizes this third technique. The EM field mitigation system 202 in accordance with the first embodiment includes an antenna element 502 and a parasitic resonator element 504. The antenna element 502 is mounted within the bottom portion 310, 410 of the housing 304, 400 (FIGS. 3 and 4). The antenna element 502 is an active, differentially-driven dipole antenna element which is driven to resonate within one or more predetermined frequency bands for transmitting and receiving RF signals within the predetermined frequency band(s). Where the portable communication device 200 operates on cellular frequencies, one of the predetermined frequency bands may be typically at or near 1900 MHz (e.g., cellular frequencies in the United States are 800 MHz, 1700 MHz and 1900 MHz).

The parasitic resonator element 504, such as a parasitic planar inverted F element (similar to a PIFA element) has a first leg and a second leg (i.e., a first leg 506 and a second leg 508) coupled to a printed circuit board (PCB) for connecting an arm 505 of the parasitic resonator element 504 to the ground plane 510 established by the PCB, conductive chassis parts, battery and major shield cans. The first leg 506 of the parasitic resonator element 504 is connected to the ground plane 510 on a first side of an effective mid-line 512 of the ground plane 510 and the second leg 508 of the parasitic resonator element 504 is connected to the ground plane 510 on a second side of the effective mid-line 512 of the ground plane 510, where the first side and the second side are measured laterally along the ground plane 510 in the x-axis direction as shown in FIG. 5.

In addition, the parasitic resonator element 504 is located a predetermined distance 514 from the antenna element 502. The predetermined distance 514 is a distance between the antenna element 502 and the parasitic resonator element 504 necessary to affect a near-field resonant pattern of the antenna element 502 near the earpiece speaker 218 (shown in dotted form in FIG. 5 as, in accordance with the first embodiment, the earpiece speaker 218 would be on the opposite side of the PCB from the parasitic resonator element 504), wherein the predetermined distance 514 is related to the effective wavelength of the antenna element 502 and the coupling of the parasitic resonator element 504 with the ground plane 510. By locating the parasitic resonator element 504 the predetermined distance 514 from the antenna element 502, the parasitic resonator element 504 creates a destructive interference with the electromagnetic emissions of the first antenna element 502 within the hearing aid compliant (HAC) measurement plane 155 near the output of the earpiece speaker 218, thereby mitigating the electromagnetic field within the HAC measurement plane 155 in order establish hearing aid compliance in the grids 165, 175 in accordance with the electric and magnetic field exclusion restrictions set out previously. In the view 500, the ground plane length 515 is approximately one hundred millimeters and the predetermined distance 514 is approximately thirty-five millimeters and is determined in response to a location of the parasitic resonator element 504 necessary to cause a perturbation in the electromagnetic field emissions of the antenna element 502 in the HAC measurement plane 155 due to the disruption of the induced currents on the ground plane 510 by the parasitic resonator element 504 of the EM field mitigation system 202. While the arm 505 is typically approximately one-fourth wavelength, in some cases the arm 505 of the parasitic resonator element 504 may need to be lengthened, bent, or inductively loaded (by either a lumped inductor or a helix coil) in order to create the necessary destructive interference in the electromagnetic fields in the HAC measurement plane 155 for compliance with the pertinent hearing aid compliance regulations (e.g., tuning the parasitic resonator element 504 by varying a length of the arm 505 or by bending the arm 505).

Figure 6C:
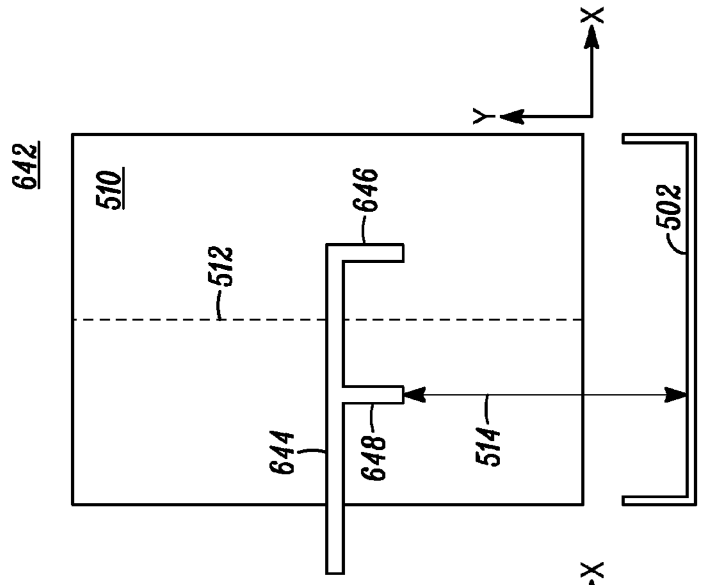
FIGS. 6A, 6B AND 6C are rear planar views of a portion of the inside structure of the portable communication device of FIG. 2 depicting several variants of the EM field mitigation system in accordance with the first embodiment.
Figure 6B:
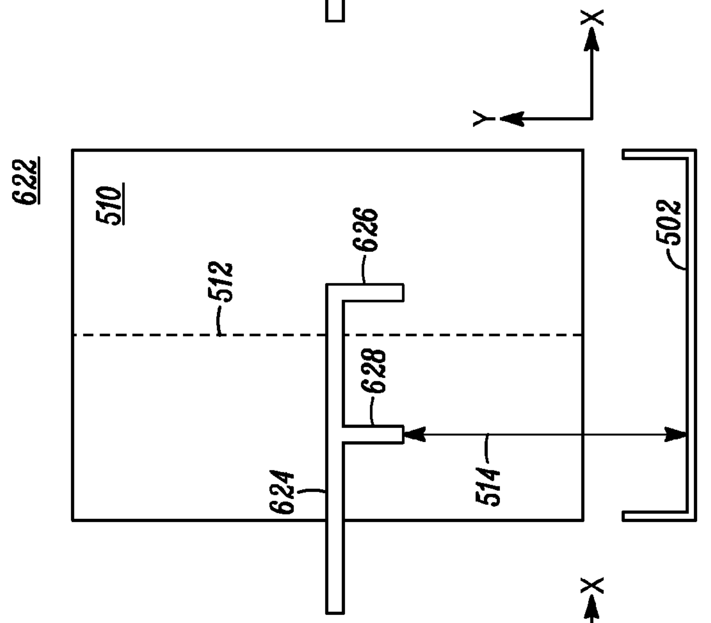
Figure 6A:
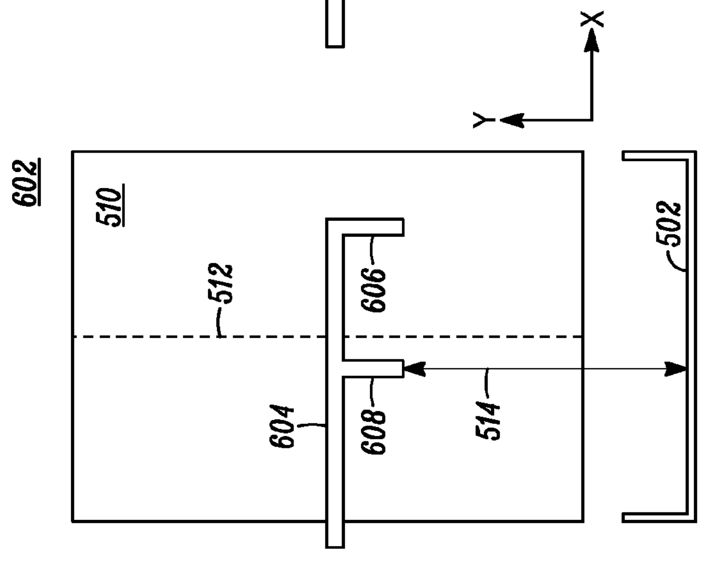

Referring to FIGS. 6A, 6B and 6C, respective rear planar views 602, 622, 642 depict a portion of the inside structure of the portable communication device 200 showing the ground plane 510 established by the printed circuit board (PCB) with three variants of the EM field mitigation system 202 in accordance with the first embodiment. While the parasitic resonator element 604, 624, 644 in each of FIGS. 6A, 6B and 6C straddles the effective mid-line 512 of the ground plane 510 such that the first leg 606, 626, 646 of each is connected to the ground plane 510 on the first side of the effective mid-line 512 and the second leg 608, 628, 648 is connected to the ground plane 510 on the second side of the effective mid-line 512, the parasitic resonator element 604, 624, 644 need not be centered over the effective mid-line 512. For example, in FIG. 6A, the parasitic resonator element 604 has the first leg 606 much further from the effective mid-line 512 than the second leg 608. Alternately, the second antenna element 624 of FIG. 6B has the first leg 626 much closer to the effective mid-line 512 than the second leg 628. In FIG. 6C, the parasitic resonator element 644 has the first leg 646 and the second leg 648 equidistant from the effective mid-line 512 of the ground plane. So, in accordance with the first embodiment, the first leg 606, 626, 646 connects to the ground plane 510 on one side of the effective mid-line 512 while the second leg 608, 628, 648 connects to the ground plane 510 on the opposite side of the effective mid-line 512. Yet, the distance of the first leg 606, 626, 646 and the distance of the second leg 608, 628, 648 from the effective mid-line 512 need not necessarily be equal, so long as the parasitic resonator element 604, 624, 644 is located the predetermined distance 514 from the first antenna element 502.

Figure 7:
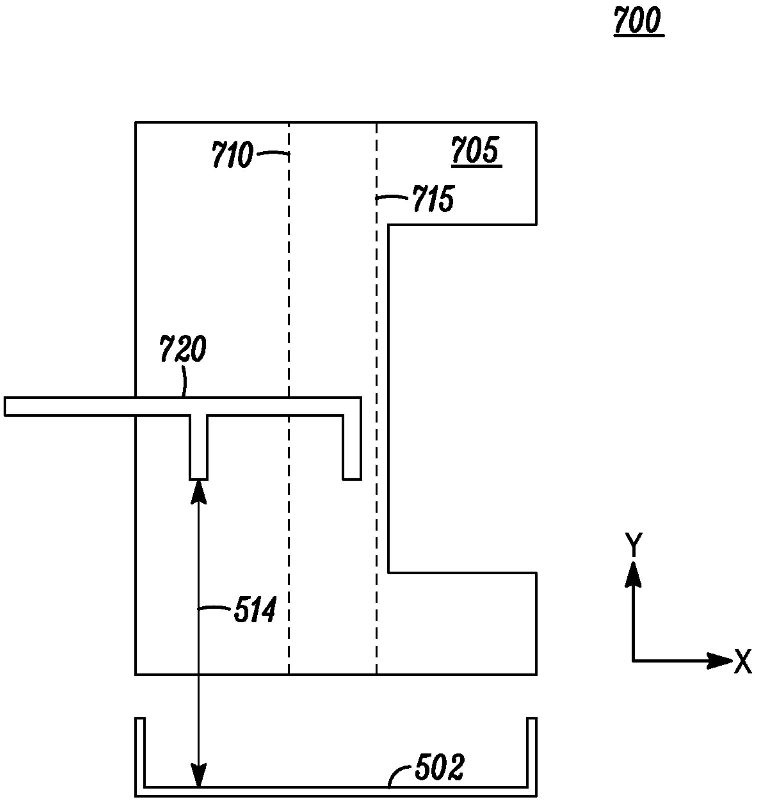
FIG. 7 is a rear planar view of a portion of the inside structure of the portable communication device of FIG. 2 depicting the EM field mitigation system in accordance with the first embodiment wherein a ground plane of the antenna system is nonsymmetrical.

Referring to FIG. 7, a rear planar view 700 of a portion of the portable communication device 200 depicts a non-symmetric ground plane 705. As can be seen in FIG. 7, the effective mid-line 710 is an effective mid-line of the electric field of the ground plane and not necessarily a planar mid-line 715. The parasitic resonator element 720 straddles the effective mid-line 710 even though the legs of the parasitic antenna element are not on either side of a planar mid-line 715 of the ground plane 705.

Figure 8B:
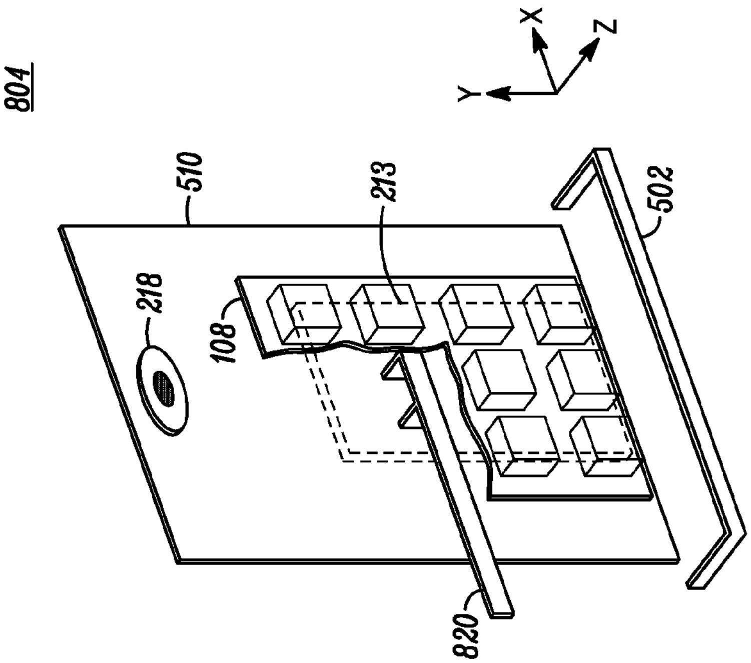
FIG. 8B is a front top left perspective view of a portion of the inside structure of the portable communication device of FIG. 2 depicting the EM field mitigation system in accordance with the first embodiment wherein the parasitic resonator element of the EM field mitigation system is mounted on a keypad side of the ground plane, the keypad being shown in partial cutaway.
Figure 8A:
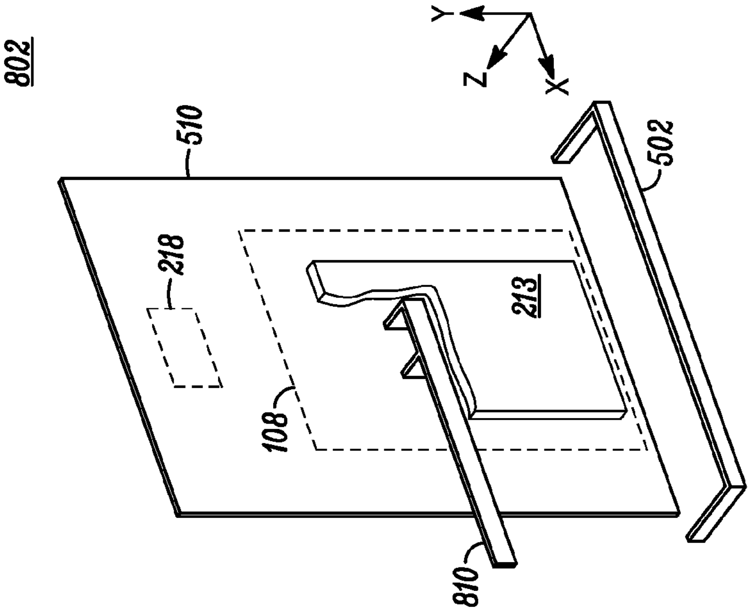
FIG. 8A is a front top left perspective view of a portion of the inside structure of the portable communication device of FIG. 2 depicting the EM field mitigation system in accordance with the first embodiment wherein a parasitic resonator element of the EM field mitigation system is mounted on a battery side of the ground plane, the battery being shown in partial cutaway.

Referring next to FIGS. 8A and 8B, front top left partially-cutaway perspective views 802 and 804, respectively, show that the parasitic resonator element 810, 820 can be placed on either a side of the PCB-established ground plane 510 (i.e., either side of the ground plane 510 in a z-axis direction as shown in FIGS. 8A and 8B). Thus, while the parasitic resonator element 810 can be located on a side of the ground plane 510 facing the battery 213 as shown in FIG. 8A or, as shown in FIG. 8B, the parasitic resonator element 820 can be located on a side of the ground plane 510 facing the keypad 108, the preferred placement of the parasitic resonator element 504 is on the side of the ground plane 510 where the earpiece speaker 218 is located (i.e., the side of the ground plane 510 facing the keypad 108 as shown in FIG. 8B).

Figure 9:
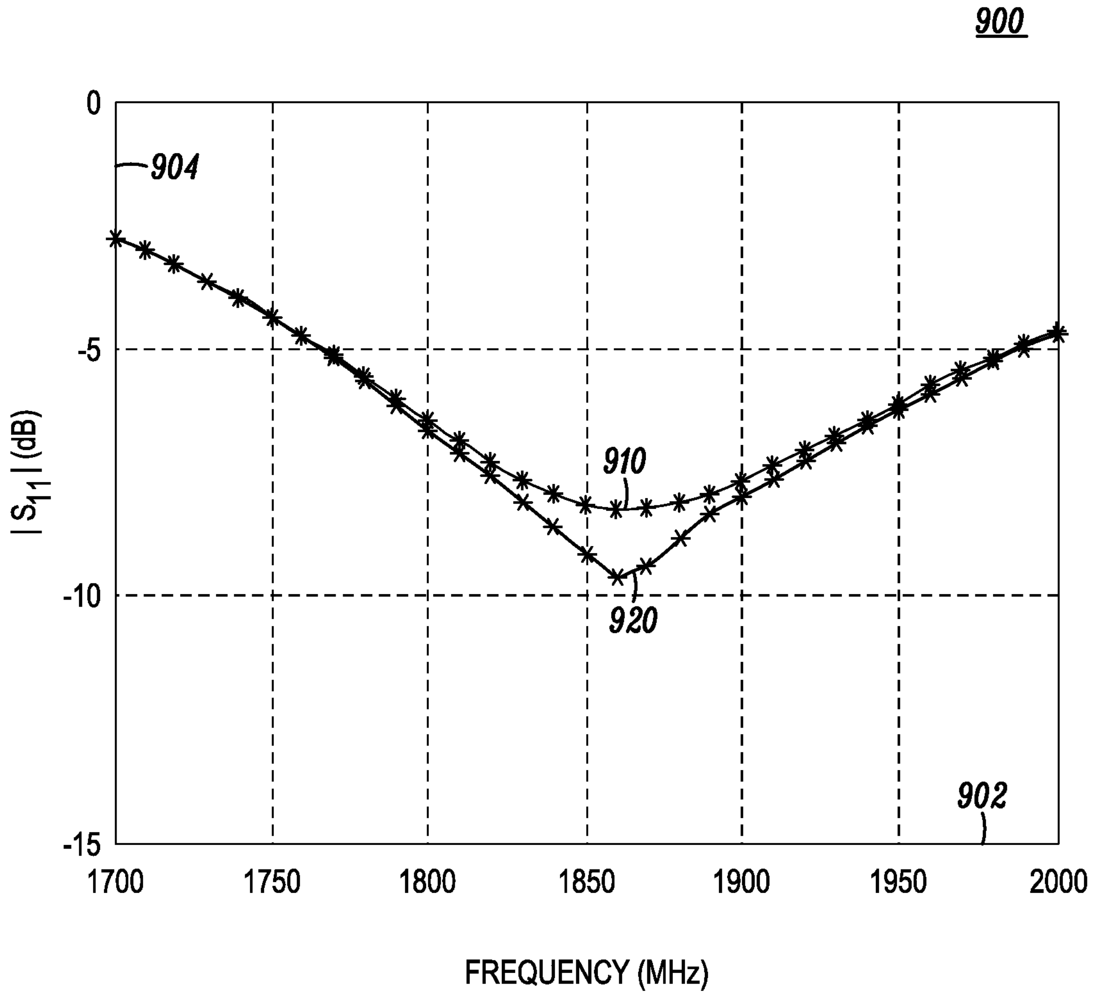
FIG. 9 is a graph of free space return loss of the antenna element of the EM field mitigation system of the portable communication device of FIG. 5 in accordance with the first embodiment.

FIG. 9 depicts a graph 900 showing the free space return loss of the EM field mitigation system 202 in accordance with the first embodiment. The frequency (in MHz) is plotted on the abscissa (i.e., the x-axis) 902 and return loss (in negative dB) is plotted on the ordinate (i.e., the y-axis) 904. The free space return loss of an antenna system with only an active dipole antenna element 502 is shown on line 910 and has good response at or around the frequency of 1850 MHz, a frequency utilized in many cellular telephone systems. The response of the EM field mitigation system 202 including the antenna element 502 and the parasitic resonator element 504 (FIG. 5) is shown by line 920 and also has good response at or around 1850 MHz frequency.

Figure 10:
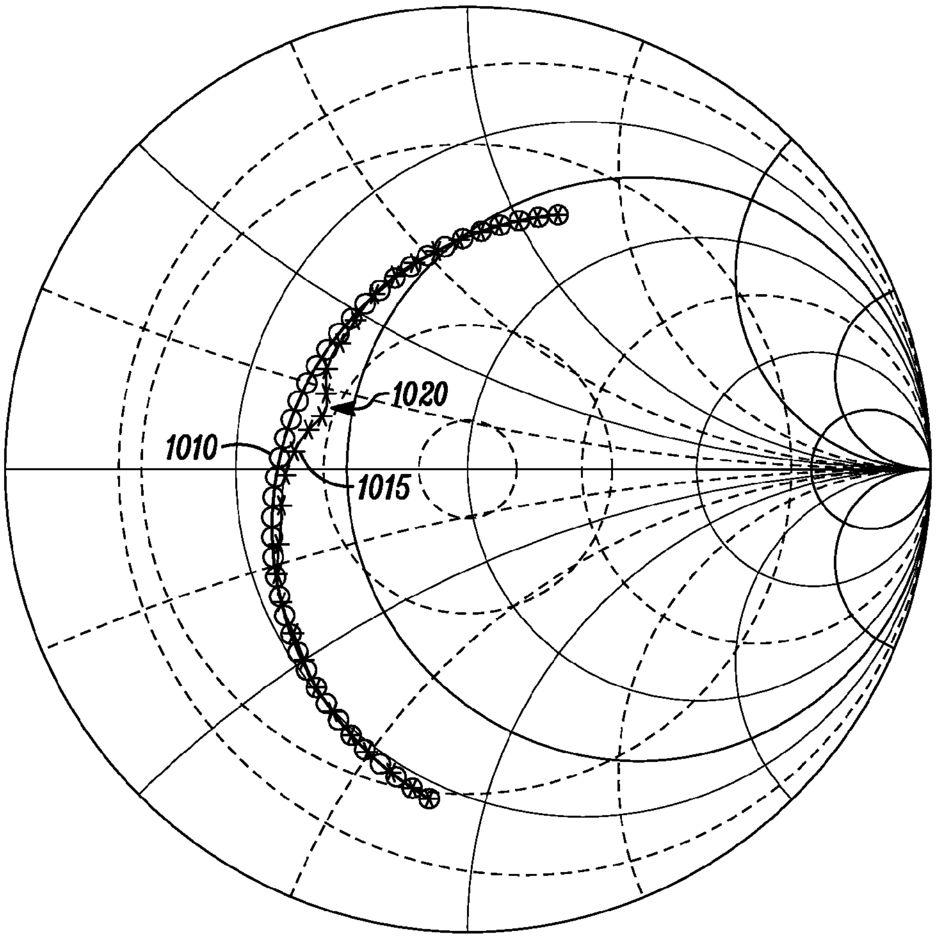
FIG. 10 is a Smith chart plot of the input impedance of the EM field mitigation system of the portable communication device of FIG. 5 with and without the parasitic resonator element in accordance with the first embodiment.

FIG. 10 depicts a Smith chart plot 1000 of a resonance of the EM field mitigation system 202 in accordance with the first embodiment. The Smith chart plot 1000 shows the resonance of an antenna system with only an active dipole antenna element 502 by circles 1010 and the response of the EM field mitigation system 202 including the antenna element 502 and the parasitic resonator element 504 by Xs 1015, and more clearly shows the additional resonance at or around 1850 MHz frequency at location 1020 on the plot 1000 due to the parasitic resonator element 504.

Figure 11A:
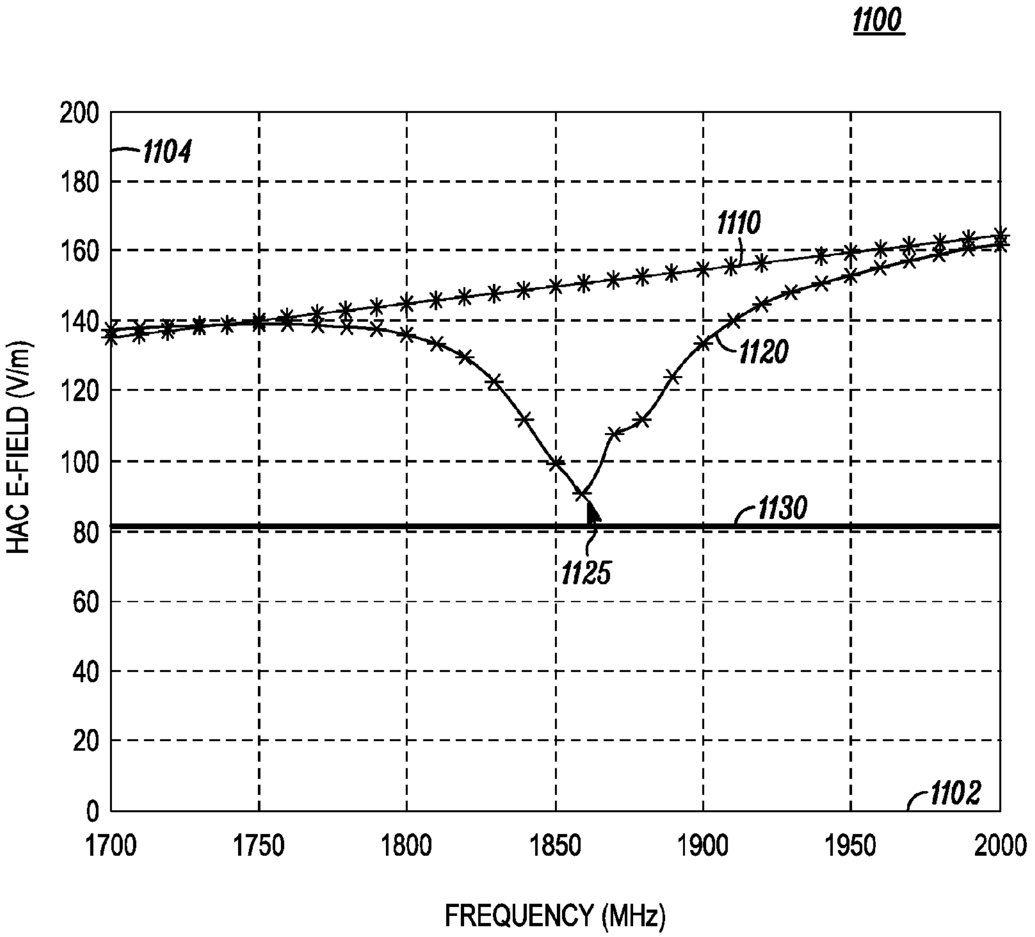
FIG. 11A is a graph of a free space electric field plot of the EM field mitigation system of the portable communication device of FIG. 5 in accordance with the first embodiment.

FIG. 11A depicts a graph 1100 of a free space electric field plot of the EM field mitigation system 202 in accordance with the first embodiment. The frequency (in MHz) is plotted on the abscissa (i.e., the x-axis) 1102 and the electric field strength (in Volts per meter) is plotted on the ordinate (i.e., the y-axis) 1104. A reference curve for an antenna system with only an active dipole antenna element 502 is shown on line 1110. The curve 1120 depicts the electric field of the EM field mitigation system 202 including the antenna element 502 and the parasitic resonator element 504 and has good response at or around 1850 MHz frequency as shown at and around location 1125 on the curve 1120. A reference line 1130 represents an upper limit of the hearing aid compliance (HAC)

electric field. Thus, it can be seen from FIG. 11A that the additional resonance from the parasitic resonator element 504 of the EM field mitigation system 202 in accordance with the first embodiment can mitigate the electromagnetic emissions of the antenna element 502 in order to assist bringing the electric field emissions into hearing aid compliance.

Figure 11B:
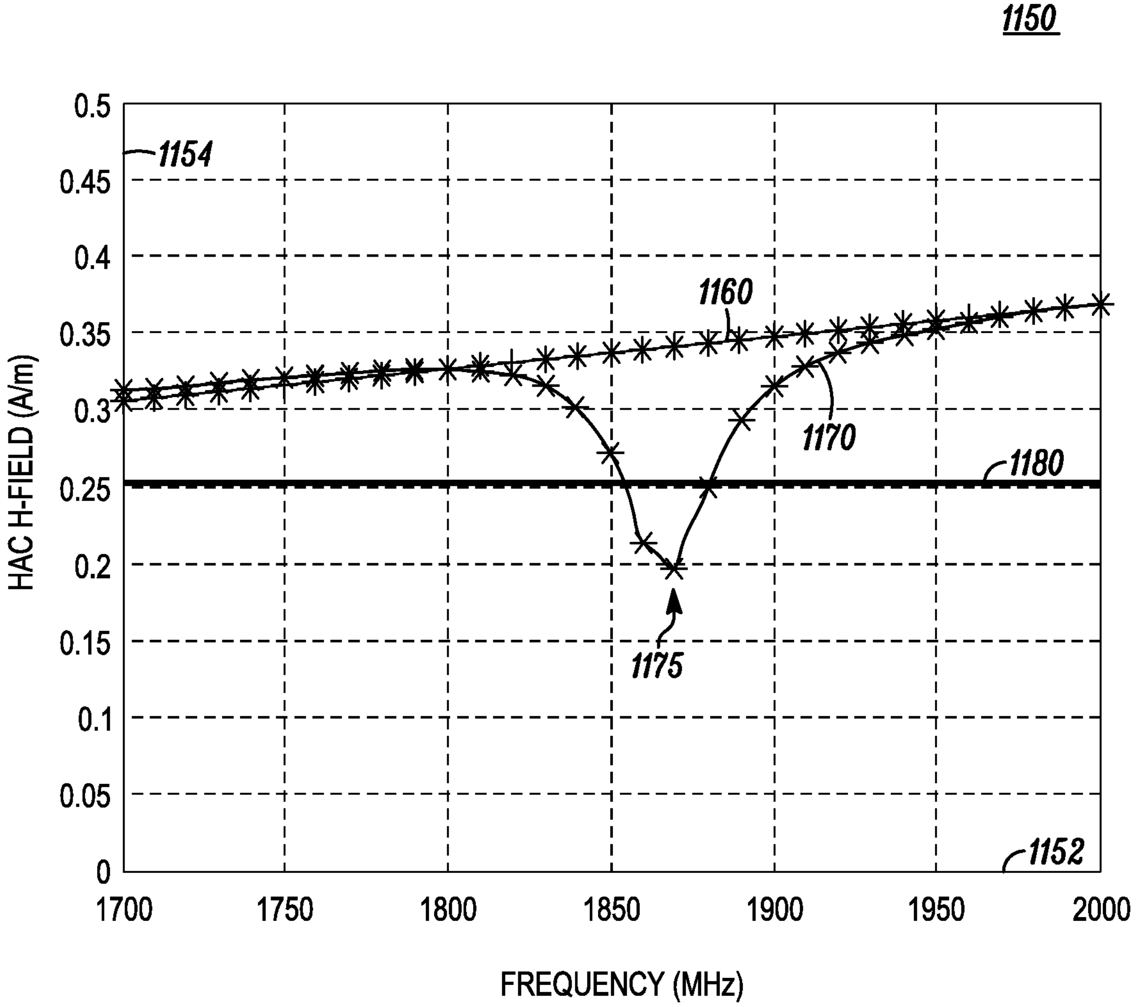
FIG. 11B is a graph of a free space magnetic field plot of the EM field mitigation system of the portable communication device of FIG. 5 in accordance with the first embodiment.

FIG. 11B depicts a similar graph 1150 of free space magnetic field strength of the EM field mitigation system 202 in accordance with the first embodiment. The frequency (in MHz) is plotted on the abscissa (i.e., the x-axis) 1152 and the magnetic field strength (in Amperes per meter) is plotted on the ordinate (i.e., the y-axis) 1154. A reference curve for an antenna system with only an active dipole antenna element 502 is shown on line 1160. The curve 1170 depicts the magnetic field of the EM field mitigation system 202 including the antenna element 502 and the parasitic resonator element 504 and has good response at or around 1850 MHz frequency, as shown at or around the location 1175 on the curve 1170. A reference line 1180 represents an upper limit of the hearing aid compliance (HAC) magnetic field. Similar to graph 1100 (FIG. 11A), the information in the free space magnetic field plot 1150 does not take into account any mismatch loss. Even without such mismatch loss factored in, magnetic field values on curve 1170 below the HAC magnetic field reference 1180 are obtained for cellular frequencies at or around 1850 MHz frequency.

Figure 12A:
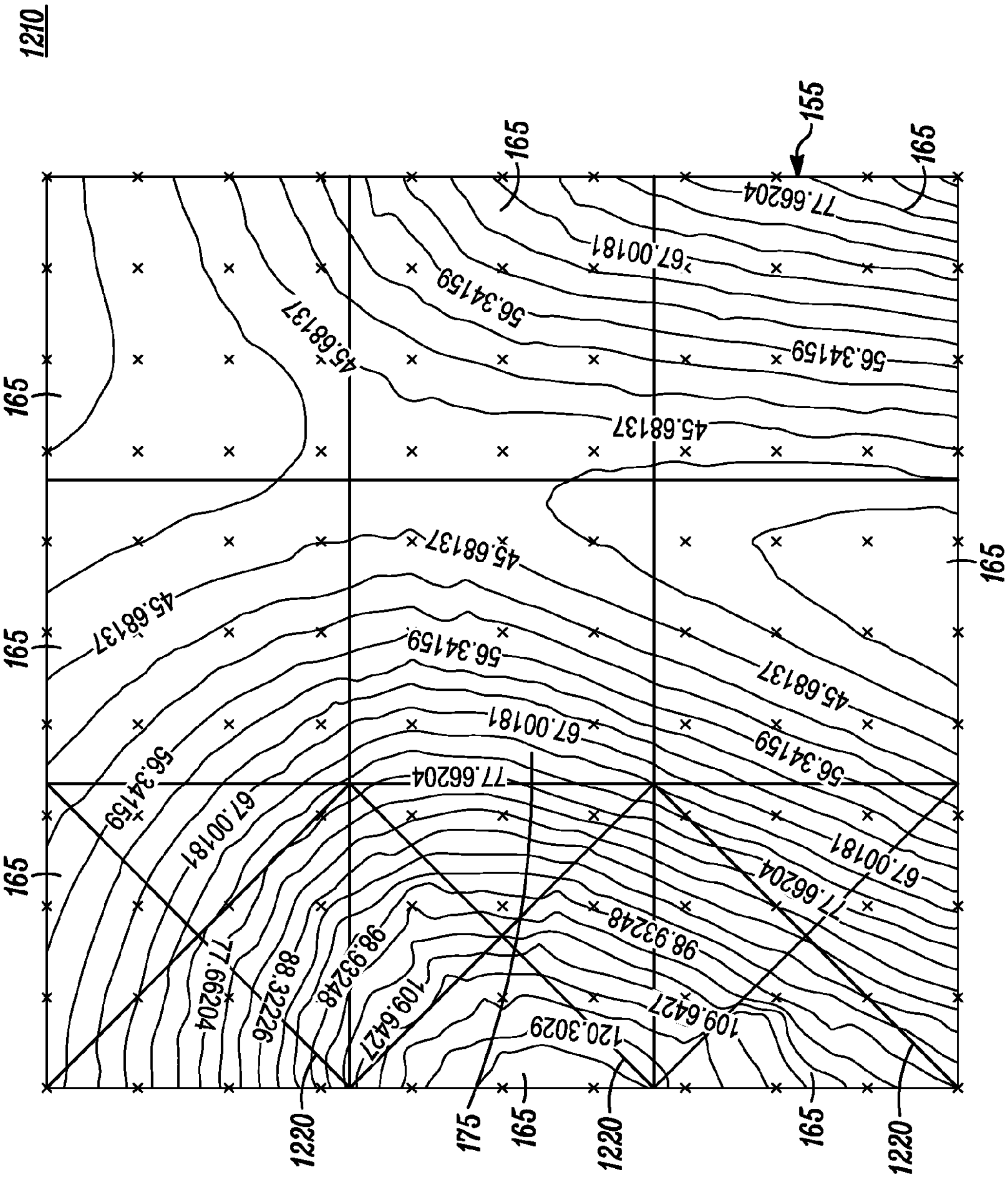
FIG. 12A is an electric field gradient diagram at the Hearing Aid Compliant (HAC) measurement plane of the EM field mitigation system of FIG. 5 in accordance with the first embodiment (which includes the parasitic resonator element)
Figure 12B:
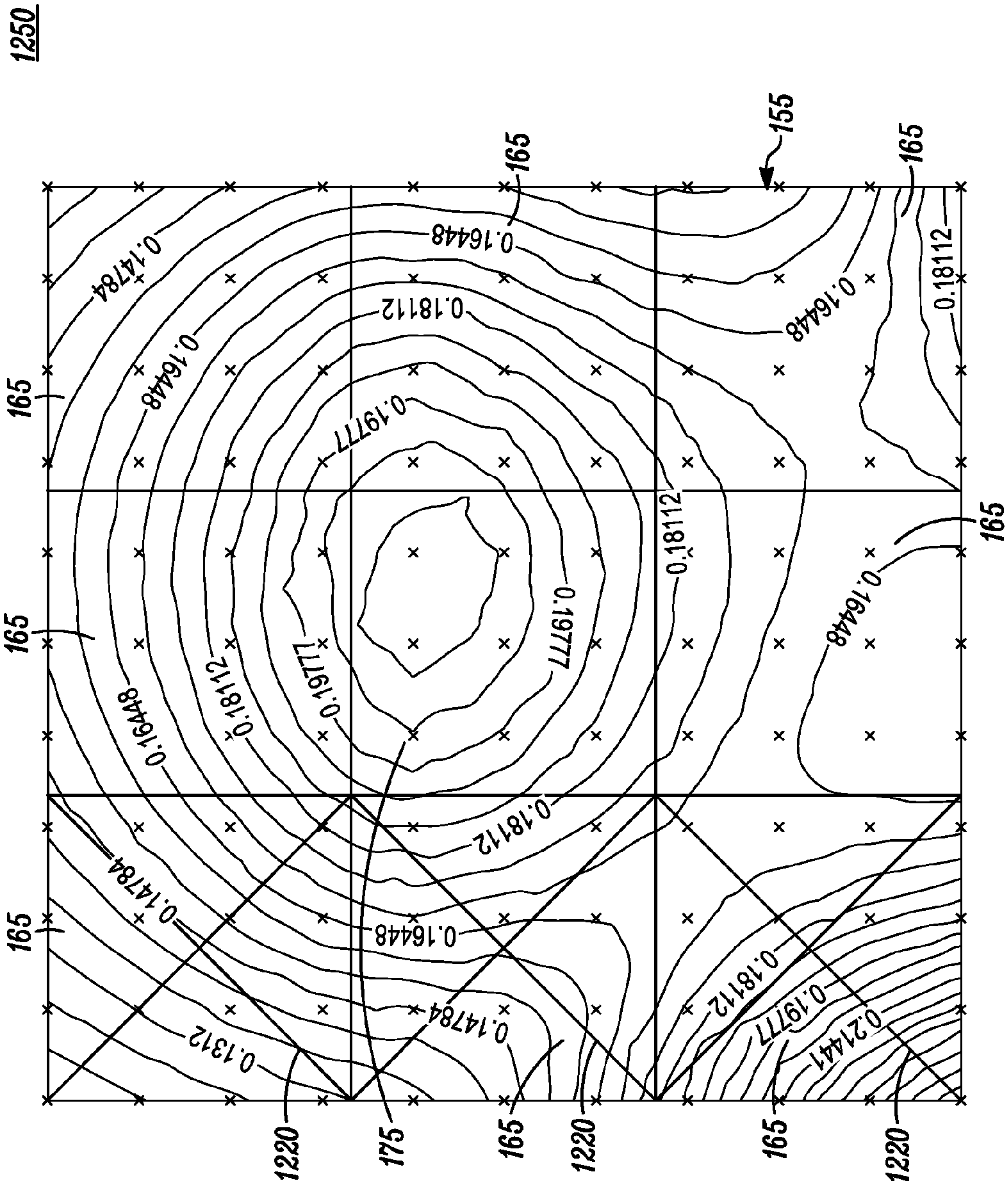
FIG. 12B is a magnetic field gradient diagram at the HAC measurement plane of the EM field mitigation system of FIG. 5 in accordance with the first embodiment (which includes the parasitic resonator element)

Referring to FIG. 12A, an electric field gradient diagram 1210 depicts the electric field of the EM field mitigation system 202 in accordance with the first embodiment (FIG. 5) at the HAC measurement plane 155 above the earpiece speaker 218. Similarly, FIG. 12B depicts a magnetic field gradient diagram 1250 showing the magnetic field of the EM field mitigation system 202 in accordance with the first embodiment at the HAC measurement plane 155. The EM field mitigation system includes both the differentially driven dipole antenna element 502 and the parasitic resonator element 504. To determine the maximum electric and magnetic fields for hearing aid compliance in the HAC measurement plane 155, three grids are excluded in accordance with the HAC grid exclusion restrictions described previously (i.e., center grid 175 is not excludable, each excluded grid is connected to at least one other excluded grid, and at least four of the non-excluded grids are common to both the magnetic field non-excluded grids and the electric field non-excluded grids). In both the electric field gradient diagram 1210 and the magnetic field gradient diagram 1250, the three grids in the left column are excluded as indicated by the X's 1220. Therefore, after excluding these three grids, the maximum electric field for hearing aid compliance determination follows a gradient which passes through the lower right grid 165 (FIG. 12A) and the maximum magnetic field for hearing aid compliance determination follows a gradient which is within the center grid 175 (FIG. 12B).

Figure 13A:
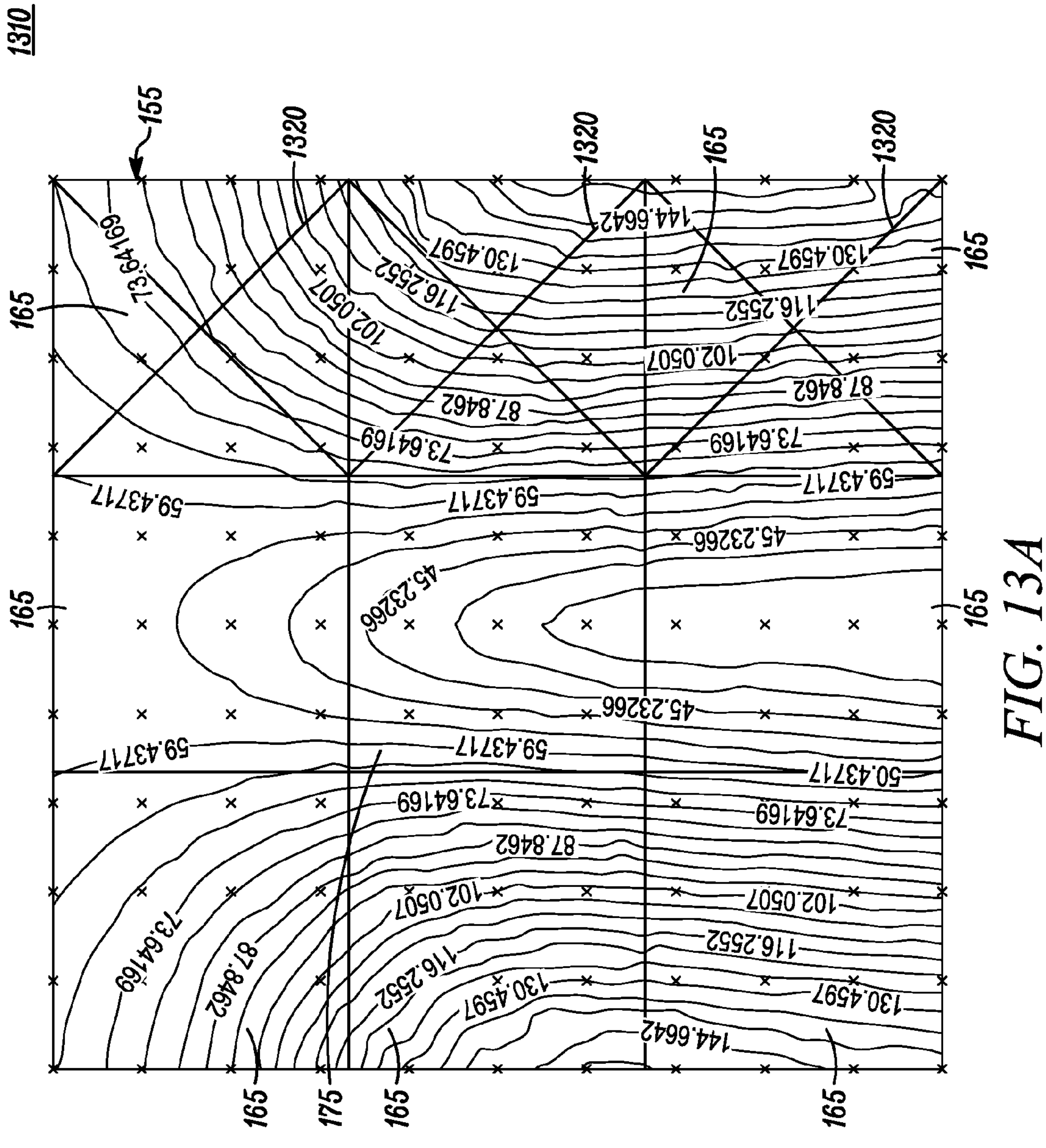
FIG. 13A is an electric field gradient diagram at the HAC measurement plane of an antenna system without the parasitic resonator element of the EM field mitigation system of FIG. 5 in accordance with the first embodiment.
Figure 13B:
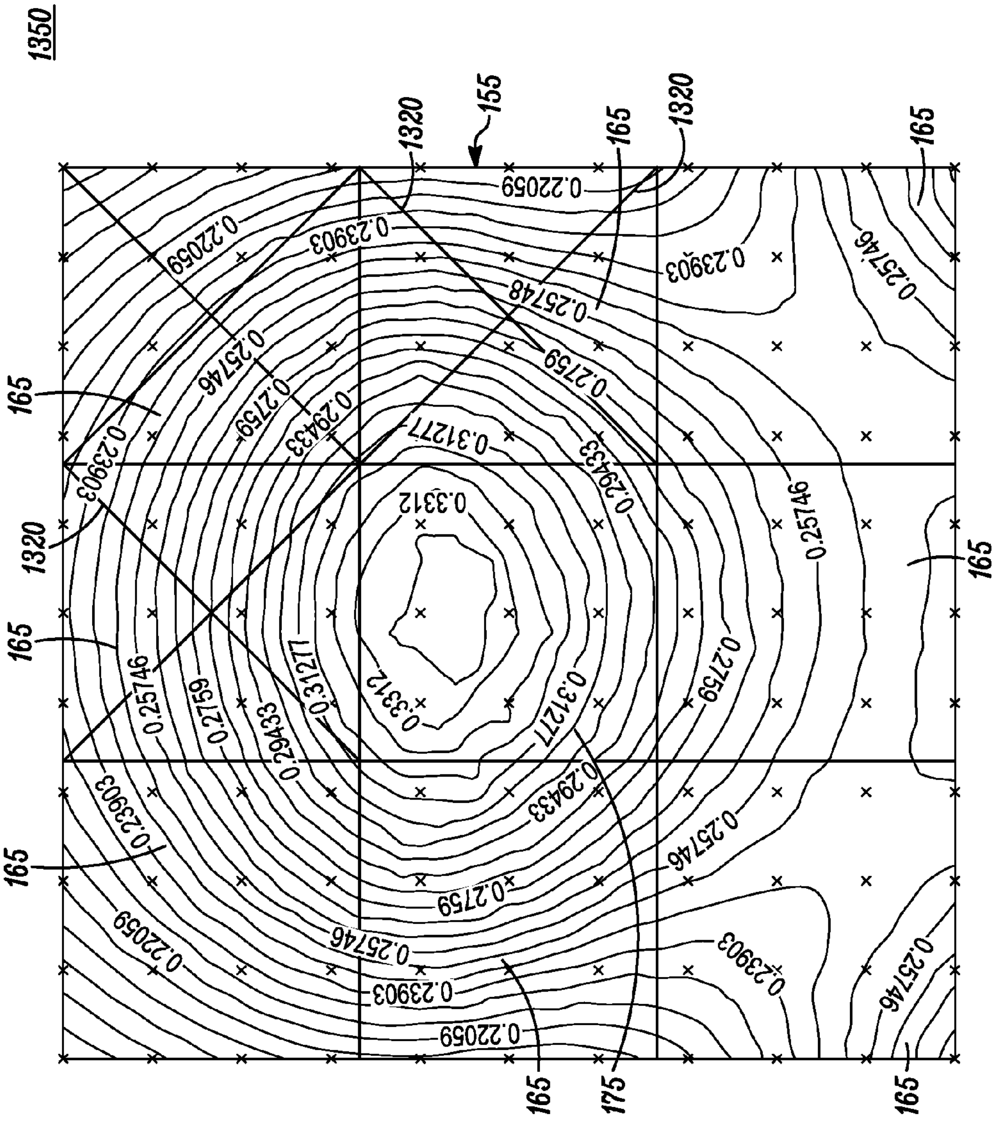
FIG. 13B is a magnetic field gradient diagram at the HAC measurement plane of an antenna system without the parasitic resonator element of the EM field mitigation system of FIG. 5 in accordance with the first embodiment.

An electric field gradient diagram 1310 depicted in FIG. 13A shows the electric field within the HAC measurement plane 155 of an antenna system with only a differential fed dipole antenna element. Likewise, in FIG. 13B, a magnetic field gradient diagram 1350 shows the magnetic field within the HAC measurement plane 155 of the antenna system with only a differential fed dipole antenna element. Utilizing the HAC exclusion rules, the three grids in the right column are excluded from the electric field gradient diagram 1310 and the top center, top right and middle right grids are excluded from the magnetic field gradient diagram 1350. Thus, the maximum electric field for hearing aid compliance determination follows a gradient which passes through the left middle grid 165 (FIG. 13A) and the maximum magnetic field for hearing aid compliance determination follows on a gradient which is within the center grid 175 (FIG. 13B). Therefore, it can be seen that the EM field mitigation system 202 in accordance with the first embodiment provides good response at cellular telephone frequencies. In addition, the EM field mitigation system 202 in accordance with the first embodiment provides compliant electromagnetic emissions in the hearing aid compliance measurement plane 155 proximate to and above the earpiece speaker 218 due to the parasitic resonator element 504. In addition to mitigating the electromagnetic fields proximate to and above the earpiece speaker 218 for hearing aid compliant electromagnetic emissions, an additional resonance is formed by the EM field mitigation system 202 in accordance with the first embodiment at or around 1850 MHz frequency due to the parasitic resonator element 504.

Figure 14:
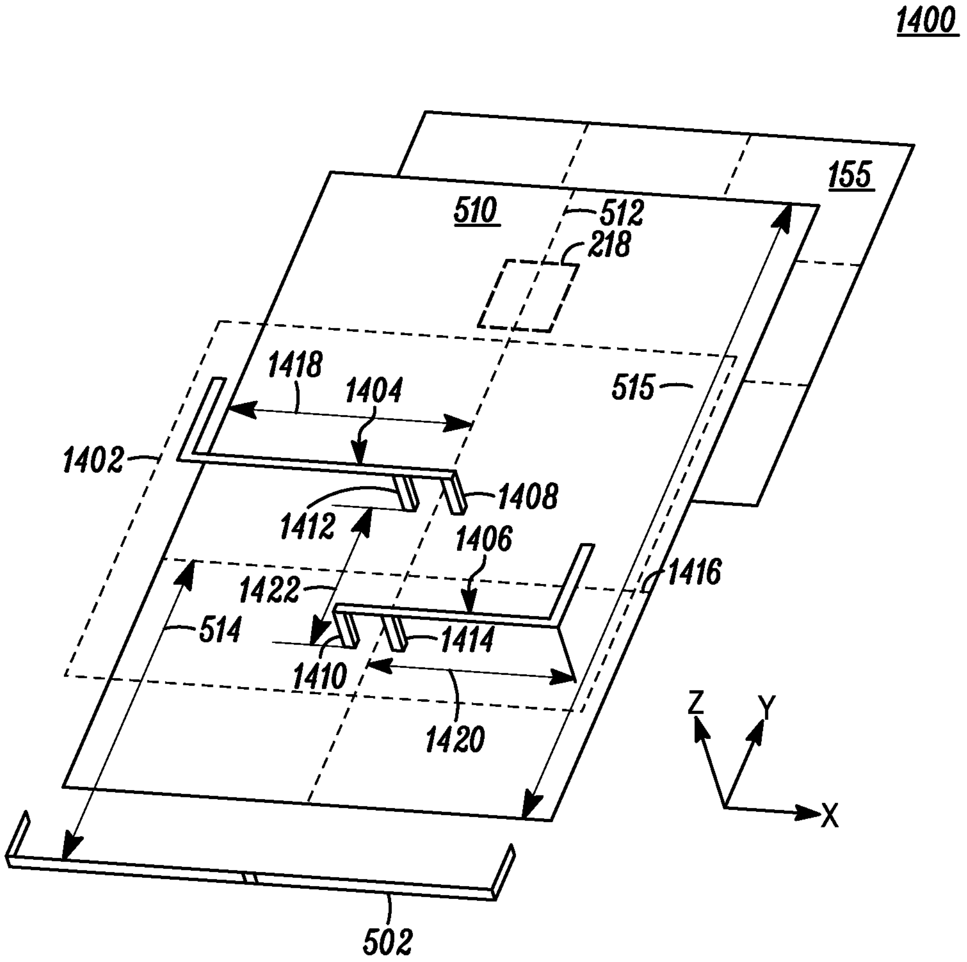
FIG. 14 is a rear bottom right perspective view of a portion of the inside structure of the portable communication device of FIG. 2 depicting an EM field mitigation system in accordance with a second embodiment.

Referring to FIG. 14, a rear bottom right perspective view 1400 of the portable communication device 200 depicts the EM field mitigation system 202 in accordance with a second embodiment. The EM field mitigation system 202 in accordance with the second embodiment includes the antenna element 502 and a two-piece parasitic resonator element 1402. The antenna element 502 is, as described previously, an active, differentially-driven dipole antenna element which is driven to resonate within one or more predetermined frequency bands for transmitting and receiving RF signals within the predetermined frequency band(s). The parasitic resonator element 1402 includes a first parasitic element 1404 and a second parasitic element 1406, either or both of the first and second parasitic elements 1404, 1406 being a parasitic planar inverted F antenna shaped element (a FIFA-shaped element). Also, each of the first and second parasitic elements 1404, 1406 include a first leg 1408, 1410 and a second leg 1412, 1414 connected to the ground plane 510 established by the printed circuit board (PCB).

The first legs 1408, 1410 of the first and second parasitic elements 1404, 1406 of the parasitic resonator element 1402 are connected to the ground plane 510 on a first side of the effective electric field mid-line 512 of the ground plane 510. Likewise, the second legs 1412, 1414 of the first and second parasitic elements 1404, 1406 are connected to the ground plane 510 on a second side of the effective mid-line 512. In addition, a transverse mid-line 1416 of the parasitic resonator element 1402 (i.e., a transverse line measured midway between the first parasitic element 1404 and the second parasitic element 1406) is located a predetermined distance 514 from the antenna element 502 in order to affect a near-field resonant pattern of the antenna element 502 above the earpiece speaker 218 in order to reduce the electromagnetic emissions of the antenna element 502 within the hearing aid compliant (HAC) measurement plane 155 near the output of the earpiece speaker 218. In the view 1400, the ground plane length 515 is also approximately one hundred millimeters and the predetermined distance 514 is approximately thirty-five millimeters. The predetermined distance 514 is determined such that the location of the parasitic resonator element 1402 creates a destructive interference in the electromagnetic fields in the HAC measurement plane 155 to mitigate or disrupt the electromagnetic emissions generated by the antenna element 502 due to the disruption of the induced currents on the ground plane 510 by the first and second parasitic elements 1404, 1406. In some cases, lengths 1418, 1420 of the first and second parasitic elements 1404, 1406 can be varied, a relative distance 1422 between the first and second parasitic elements 1404, 1406 can be varied, or the parasitic resonator element 1402 can be placed on either the keypad side or the battery side of the ground plane 510 (see FIGS. 8A and 8B) in order to mitigate the electromagnetic fields in the HAC reference plane 155 for compliance with the pertinent hearing aid compliance regulations.

Figure 15:
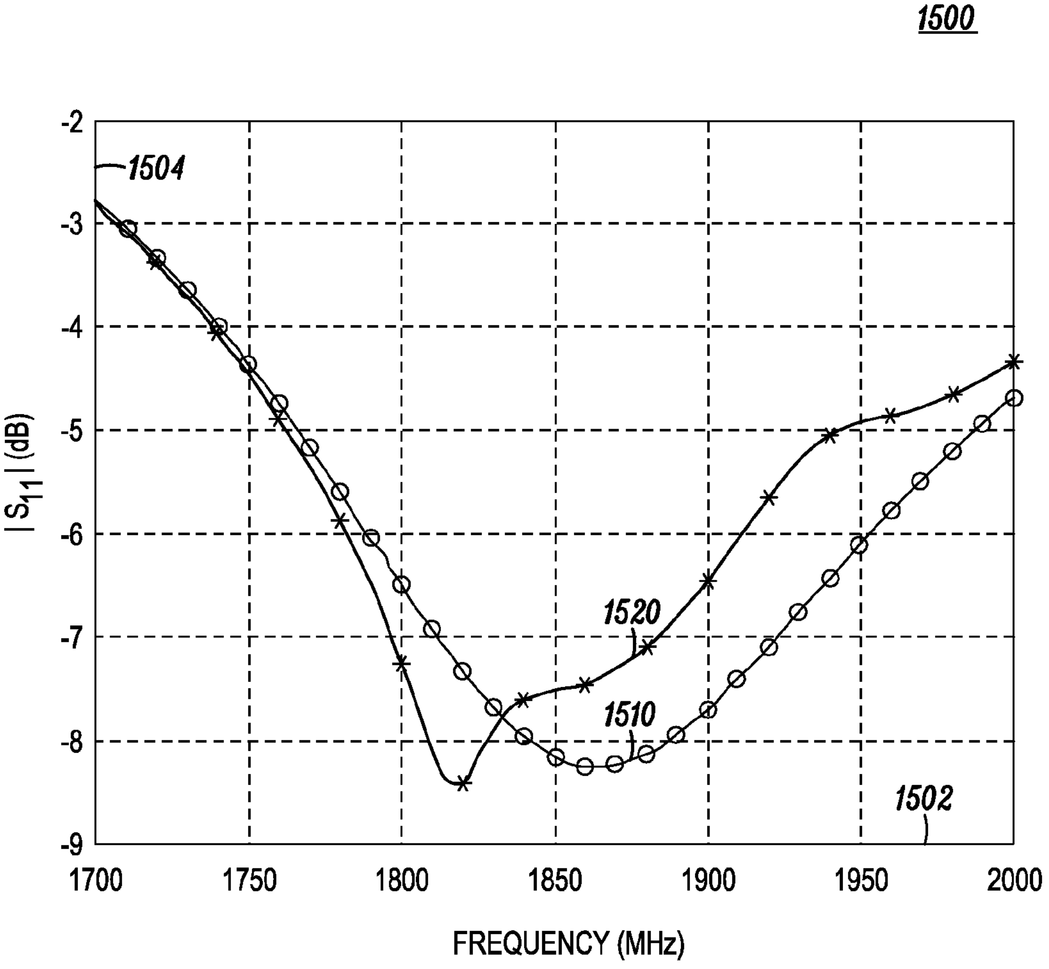
FIG. 15 is a graph of free space return loss of the antenna element of the EM field mitigation system of the portable communication device of FIG. 14 in accordance with the second embodiment.

Referring next to FIG. 15, a graph 1500 depicts the free space return loss of the EM field mitigation system 202 in accordance with the second embodiment. The frequency (in MHz) is plotted on the abscissa (i.e., the x-axis) 1502 and return loss (in negative dB) is plotted on the ordinate (i.e., the y-axis) 1504. The free space return loss of an antenna system with only a dipole antenna element 502 is shown on line 1510 and has good response at or around the frequency band between 1800 MHz and 1850 MHz. The response of the EM field mitigation system 202 in accordance with the second embodiment which includes the antenna element 502 and the two-piece parasitic resonator element 1402 including the parasitic elements 1404 and 1406 is shown by line 1520. From the graph 1500, it can be seen that the response of the EM field mitigation system 202 in accordance with the second embodiment indicates the parasitic element 1402 has been excited.

Figure 16:
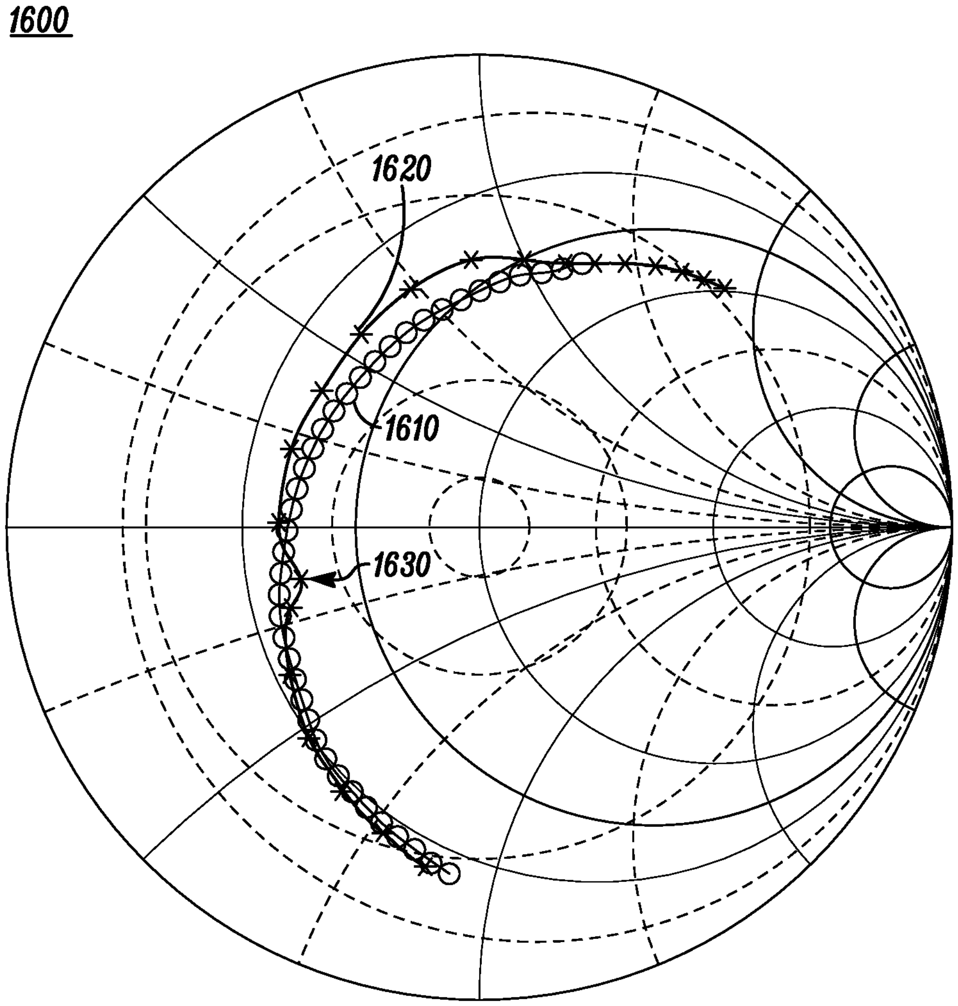
FIG. 16 is a Smith chart plot of the input impedance of the EM field mitigation system of the portable communication device of FIG. 14 with and without the parasitic resonator in accordance with the second embodiment.

Referring to FIG. 16, a Smith chart plot 1600 of a resonance of the EM field mitigation system 202 in accordance with the second embodiment showing the resonance of an antenna system with only a dipole antenna element 502 by circles 1610 and the response of the EM field mitigation system 202 in accordance with the second embodiment which includes the antenna element 502 and the dual parasitic elements 1404, 1406 by Xs 1620. The Smith chart plot 1600 shows the additional resonance from the excitation of the parasitic resonator element 1402 at location 1630.

Figure 17:
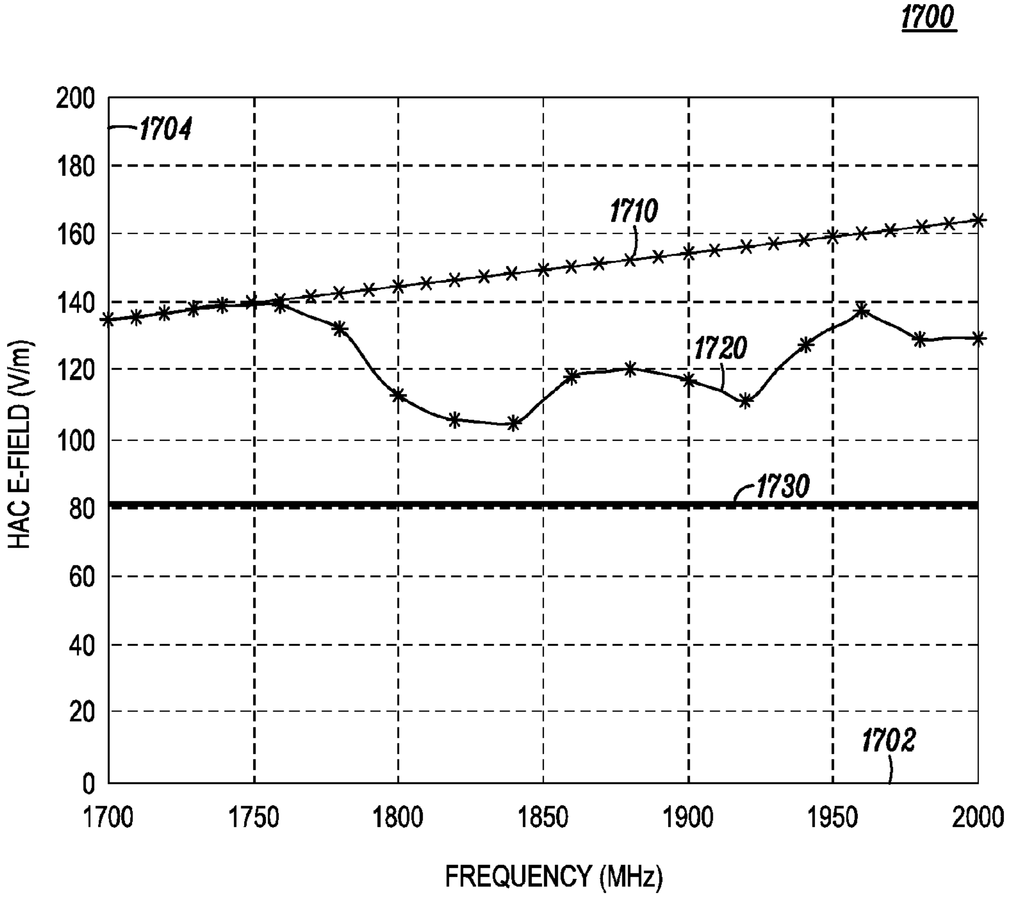
FIG. 17 is a graph of a free space electric field plot of the EM field mitigation system of the portable communication device of FIG. 14 in accordance with the second embodiment.

FIG. 17 depicts a graph 1700 of a free space electric field plot of the EM field mitigation system 202 in accordance with the second embodiment. The frequency (in MHz) is plotted on the abscissa (i.e., the x-axis) 1702 and the electric field strength (in Volts per meter) is plotted on the ordinate (i.e., the y-axis) 1704. A reference curve for an antenna system with only a dipole antenna element 502 is shown on line 1710. The curve 1720 depicts the electric field of the EM field mitigation system 202 including the antenna element 502 and the dual parasitic elements 1404, 1406. A reference line 1730 represents an upper limit of an M3 hearing aid compliant (HAC) electric field. The addition of the dual parasitic elements 1404, 1406 comprising the parasitic resonator element 1402 mitigates the electric field emissions of the EM field mitigation system 202 as seen in electric field values 1720. The information in graph 1700 does not take into account any return losses. Even so, it can be seen from FIG. 17A that the additional resonance from the dual parasitic elements 1404, 1406 of the EM field mitigation system 202 in accordance with the second embodiment mitigates the electric field emissions to assist bringing the portable communication device 200 into hearing aid compliance without decreasing the power provided to transmissions from the portable communication device 200.

Figure 18:
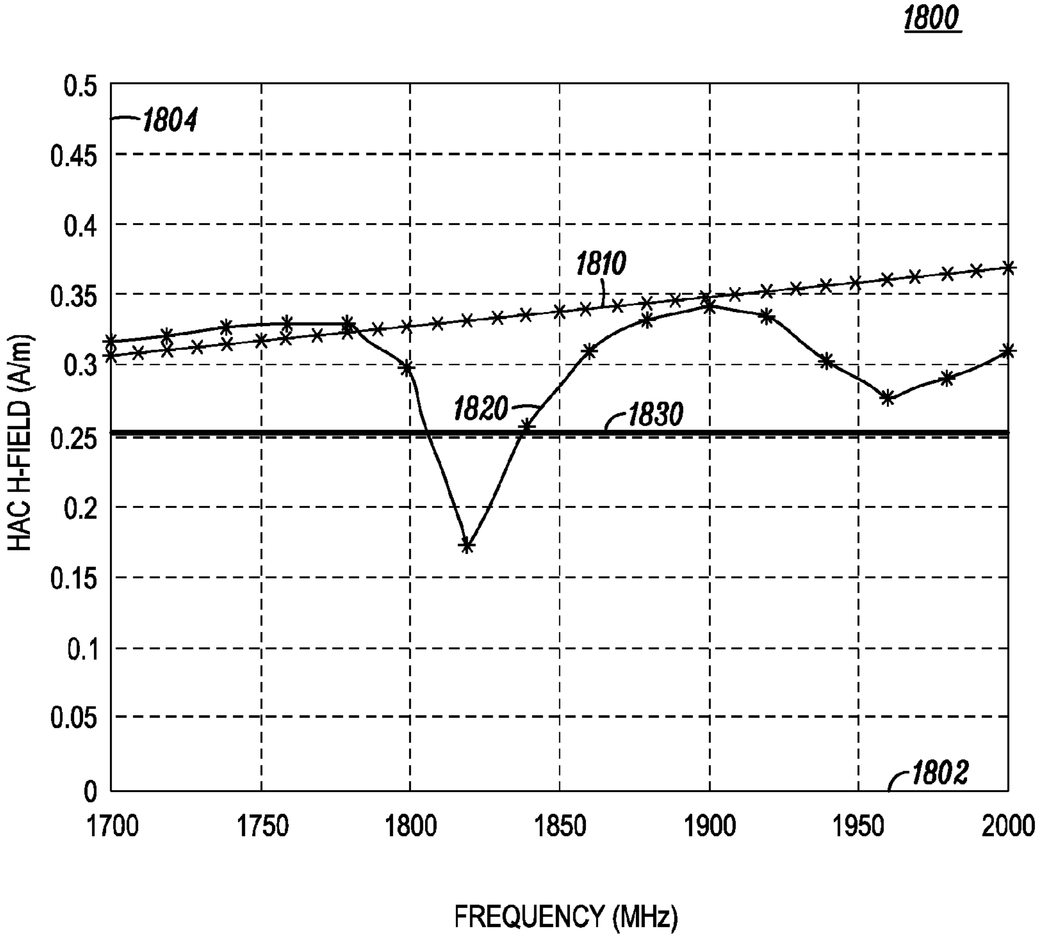
FIG. 18 is a graph of a free space magnetic field plot of the EM field mitigation system of the portable communication device of FIG. 14 in accordance with the second embodiment.

FIG. 18 depicts a similar graph 1800 of magnetic field strength of the EM field mitigation system 202 in accordance with the second embodiment. The frequency (in MHz) is plotted on the abscissa (i.e., the x-axis) 1802 and the magnetic field strength (in Amperes per meter) is plotted on the ordinate (i.e., the y-axis) 1804. A reference curve for an antenna system with only a dipole antenna element 502 is shown on line 1810. The curve 1820 depicts the magnetic field of the EM field mitigation system 202 including the antenna element 502 and the dual parasitic elements 1404, 1406. A reference line 1830 represents an upper limit of the M3 hearing aid compliant (HAC) magnetic field. Similar to graph 1700 as stated previously, the information in graph 1800 does not take into account any return losses. Even without such return loss and dissipative losses factored in, magnetic field values 1820 below the HAC magnetic field reference 1830 are obtained for cellular frequencies between 1800 MHz and 1850 MHz.

Figure 19:
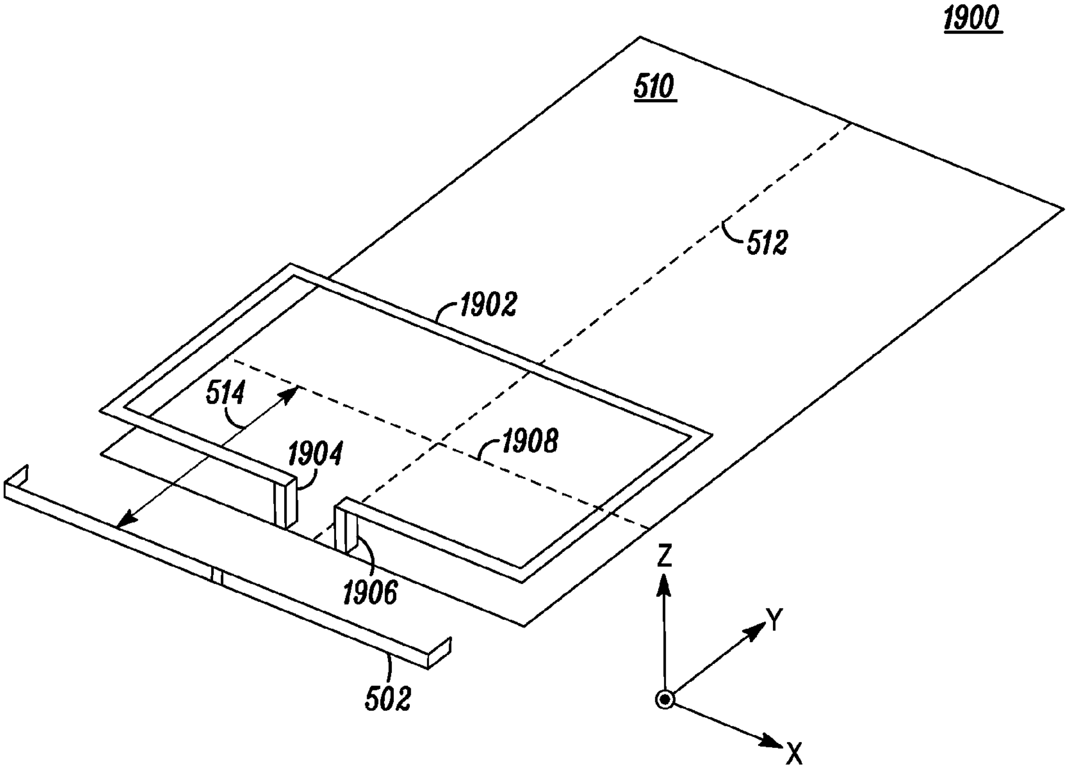
FIG. 19 is a rear bottom right perspective view of an EM field mitigation system of the portable communication device of FIG. 2 in accordance with a third embodiment.

Referring to FIG. 19, a rear bottom right perspective view 1900 of the portable communication device 200 depicts the EM field mitigation system 202 in accordance with a third embodiment. The EM field mitigation system 202 in accordance with the third embodiment includes the antenna element 502 and a parasitic resonator element 1902. The antenna element 502 is, as described previously, an active, differentially-driven dipole antenna element which is driven to resonate within one or more predetermined frequency bands for transmitting and receiving RF signals within the predetermined frequency band(s). The parasitic resonator element 1902 is a loop parasitic resonator element and provides a full wave resonance response due to a full perimeter of the parasitic resonator element 1902 being approximately a full wavelength at or around a frequency of 1850 MHz. A first leg 1904 and a second leg 1906 are connected to the ground plane 510 established by the PCB on either side of the effective electric field mid-line 512 of the ground plane 510 for connecting the parasitic resonator element 1902 to the ground plane 510.

The loop parasitic resonator element 1902 affects a near-field resonant pattern of the antenna element 502 above the earpiece speaker 218 in order to disrupt and/or mitigate the electromagnetic emissions of the antenna element 502 within the hearing aid compliant (HAC) measurement plane 155 near the output of the earpiece speaker 218 as determined by the predetermined distance 514 between the antenna element 502 and the parasitic resonator element 1902 (as measured to a median line 1908 of the parasitic resonator element 1902). The electromagnetic emissions within the HAC measurement plane 155 are mitigated due to a destructive interference of the electromagnetic fields arising from the antenna element 502 disrupting the induced currents on the ground plane 510 generated by the loop parasitic resonator element 1902. The EM field mitigation system 202 in accordance with the third embodiment can be utilized on unhinged, "candy bar" style portable communication devices 200 as well as on hinged, "clamshell" type portable communication devices 200. In addition, the loop parasitic resonator element 1902 can be mounted on either the side of the ground plane 510 facing the battery 213 or the side of the ground plane 510 facing the keypad 108. The full perimeter of the loop parasitic resonator element 1902 is a wavelength based dimension and can be adjusted to accommodate for non-uniformity of the ground plane 510 of the portable communication device 200.

Figure 20:
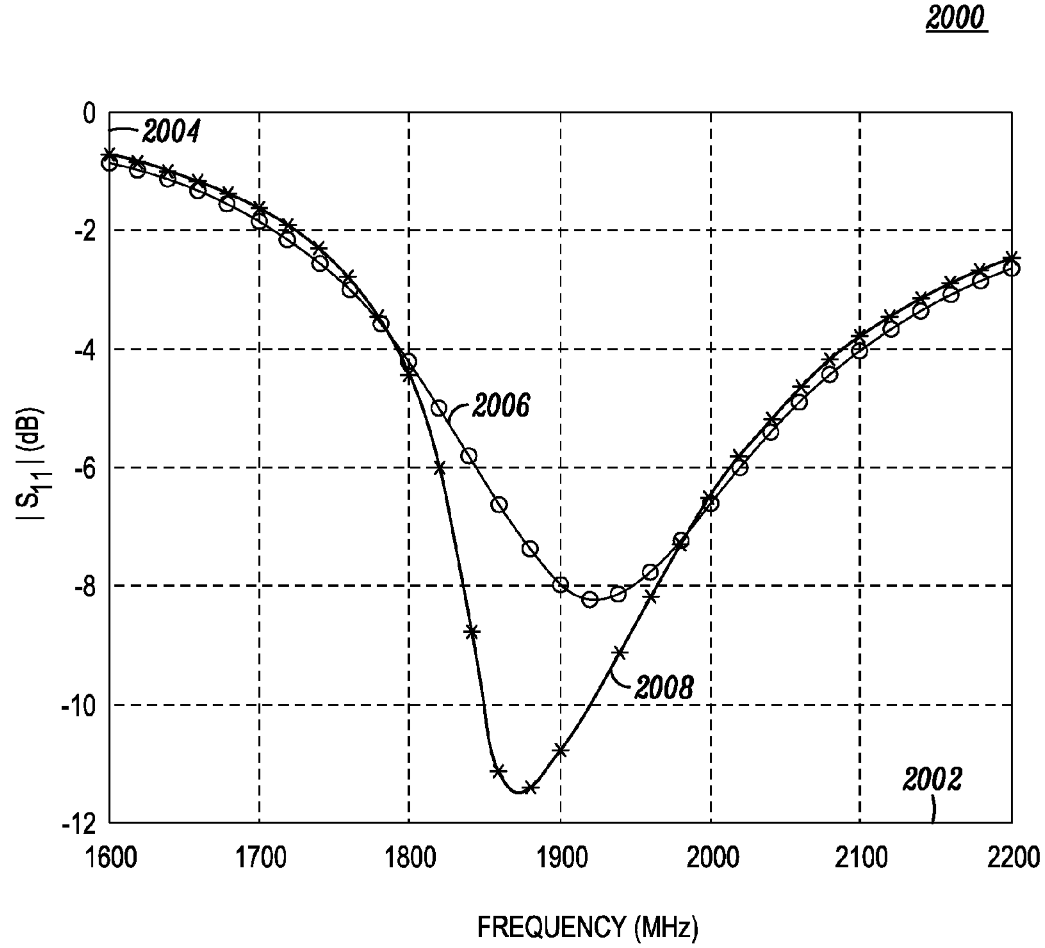
FIG. 20 is a graph of free space return loss of the antenna element of the EM field mitigation system of the portable communication device of FIG. 2 in accordance with the third embodiment depicted in FIG. 19.

Referring next to FIG. 20, a graph 2000 depicts the free space return loss of the antenna element of the EM field mitigation system 202 in accordance with the third embodiment. The frequency (in MHz) is plotted on the abscissa (i.e., the x-axis) 2002 and return loss (in negative dB) is plotted on the ordinate (i.e., the y-axis) 2004. The free space return loss of an antenna system with only a dipole antenna element 502 is shown on line 2006 and has good response at or around the 1900 MHz. The response of the EM field mitigation system 202 in accordance with the third embodiment which includes the antenna element 502 and the parasitic resonator element, i.e., the loop parasitic resonator element 1902, is shown by line 2008. Thus, it can be seen that the EM field mitigation system 202 in accordance with the third embodiment provides good response at cellular telephone frequencies even while the loop parasitic resonator element 1902 is excited.

Figure 21:
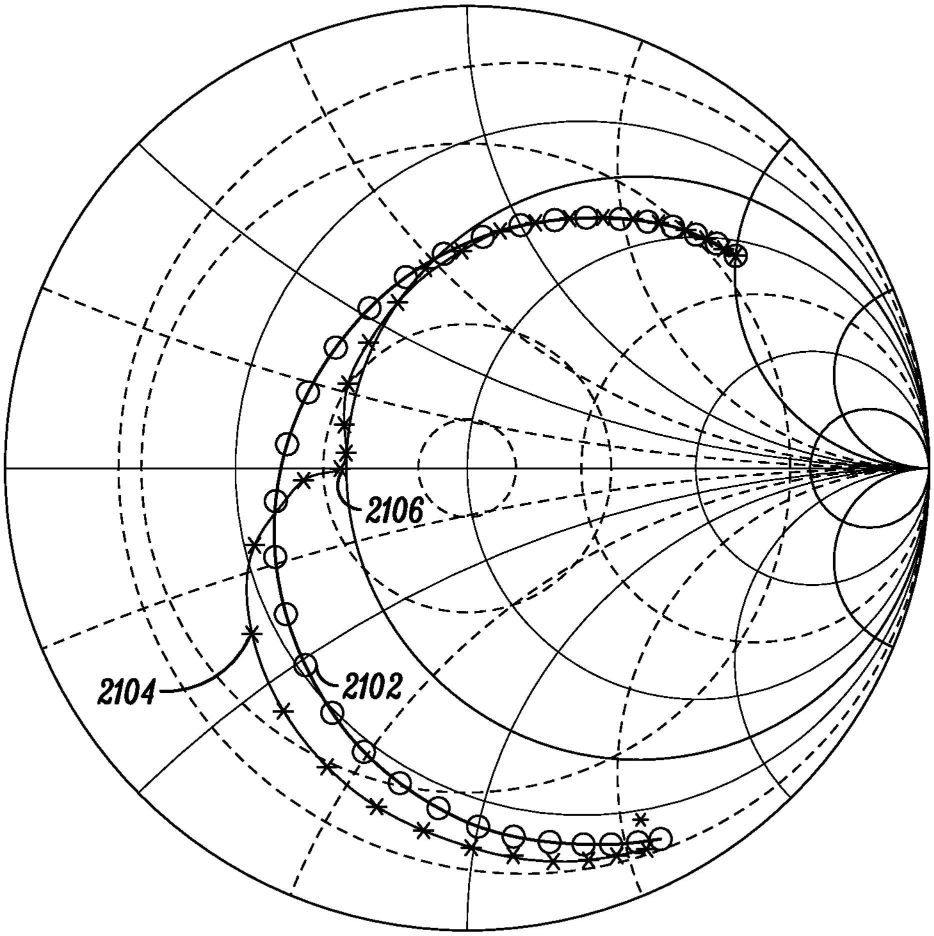
FIG. 21 is a Smith chart plot of the input impedance of the EM field mitigation system of the portable communication device of FIG. 2 in accordance with the third embodiment depicted in FIG. 19.

Referring to FIG. 21, a Smith chart plot 2100 of a resonance of the EM field mitigation system 202 in accordance with the third embodiment showing the resonance of the antenna system with only a dipole antenna element 502 by circles 2102 and the response of the EM field mitigation system 202 including the antenna element 502 and the loop parasitic resonator element 1902 by Xs 2104. The additional resonance due to excitation of the loop parasitic resonator element 1902 can be seen at and around point 2106.

Figure 22A:
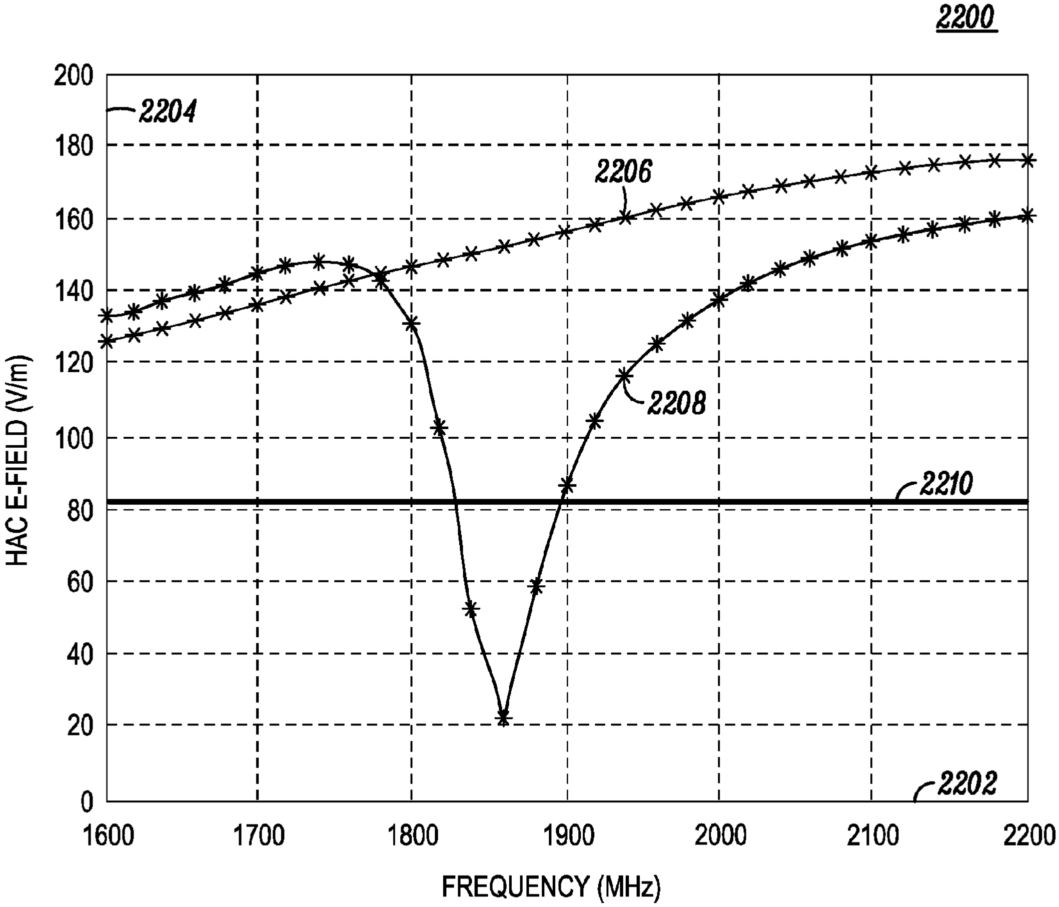
FIG. 22A is a graph of a free space electric field plot of the EM field mitigation system of the portable communication device of FIG. 2 in accordance with the third embodiment depicted in FIG. 19.

FIG. 22A depicts a graph 2200 of a free space electric field plot of the EM field mitigation system 202 in accordance with the third embodiment. The frequency (in MHz) is plotted on the abscissa (i.e., the x-axis) 2202 and the electric field strength (in Volts per meter) is plotted on the ordinate (i.e., the y-axis) 2204. A reference curve for an antenna system with only a dipole antenna element 502 is shown on line 2206. The curve 2208 depicts the electric field of the EM field mitigation system 202 including the antenna element 502 and the loop parasitic resonator element 1902. A reference line 2210 represents an upper limit of the M3 hearing aid compliant (HAC) electric field. The addition of the loop parasitic antenna element 1902 mitigates the electric field emissions of the EM field mitigation system 202 as seen in electric field values 2208. The information in graph 2200 does not take into account any return losses. Even so, it can be seen from FIG. 22A that the additional resonance from the parasitic element 1902 of the EM field mitigation system 202 in accordance with the third embodiment mitigates the electric field emissions to assist bringing the portable communication device 200 into hearing aid compliance without decreasing the power provided to transmissions from the portable communication device 200.

Figure 22B:
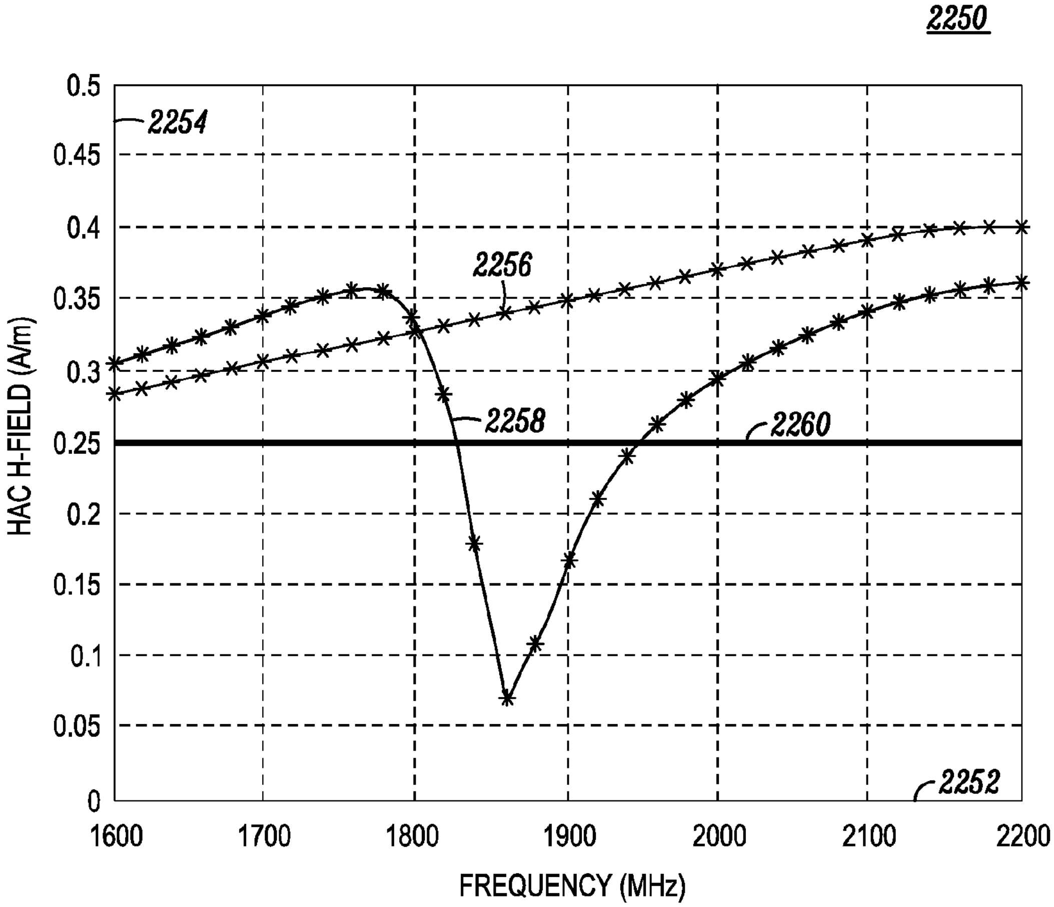
FIG. 22B is a graph of a free space magnetic field plot of the EM field mitigation system of the portable communication device of FIG. 2 in accordance with the third embodiment depicted in FIG. 19.

FIG. 22B depicts a similar graph 2250 of a magnetic field strength plot of the EM field mitigation system 202 in accordance with the third embodiment. The frequency (in MHz) is plotted on the abscissa (i.e., the x-axis) 2252 and the magnetic field strength (in Amperes per meter) is plotted on the ordinate (i.e., the y-axis) 2254. A reference curve for an antenna system with only a dipole antenna element 502 is shown on line 2256. The curve 2258 depicts the magnetic field of the EM field mitigation system 202 including the antenna element 502 and the loop parasitic resonator element 1902. A reference line 2260 represents an upper limit of the M3 hearing aid compliant (HAC) magnetic field. Similar to graph 2200 discussed previously, the information in graph 2250 does not take into account any return losses.

Figure 23A:
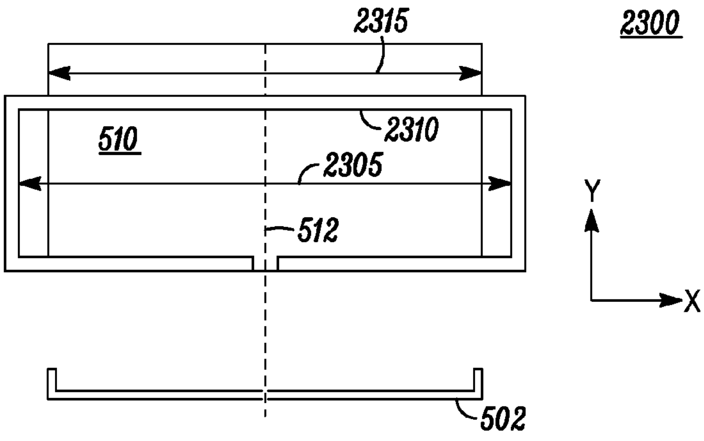
FIG. 23A is a rear planar view of an EM field mitigation system of the portable communication device of FIG. 2 in accordance with a first alternative of the third embodiment.
Figure 23B:
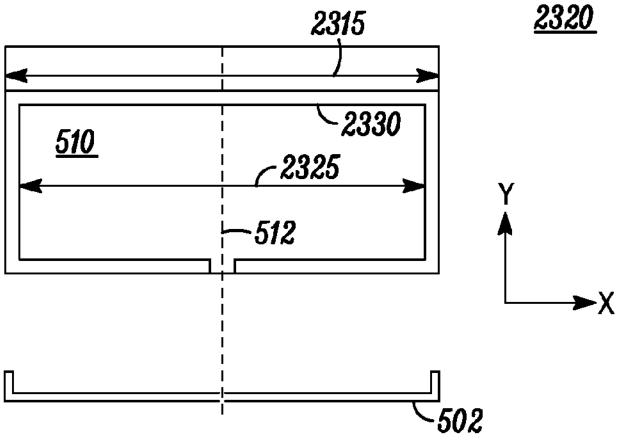
FIG. 23B is a rear planar view of an EM field mitigation system of the portable communication device of FIG. 2 in accordance with a second alternative of the third embodiment.
Figure 23C:
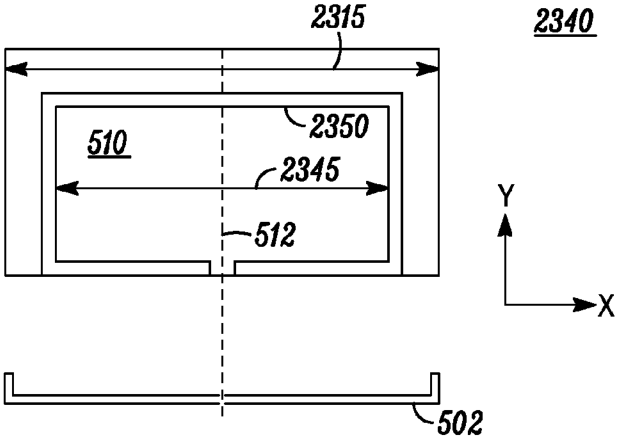
FIG. 23C is a rear planar view of an EM field mitigation system of the portable communication device of FIG. 2 in accordance with a third alternative of the third embodiment.

Placement of the loop parasitic antenna element 1902 in relation to the ground plane 510 has several alternative variations, each variation having a leg on either side of the effective electric field mid-line 512. FIG. 23A depicts a rear planar view 2300 of the EM field mitigation system 202 in accordance with a first alternative of the third embodiment wherein a width 2305 of the loop formed by a loop parasitic resonator element 2310 is wider than a width 2315 of the ground plane 510. FIG. 23B depicts a rear planar view 2320 of the EM field mitigation system 202 in accordance with a second alternative of the third embodiment wherein a width 2325 of the loop formed by the loop parasitic resonator element 2330 is the same as the width 2315 of the ground plane 510. FIG. 23C depicts a rear planar view 2340 of the EM field mitigation system 202 in accordance with a third alternative of the third embodiment wherein a width 2345 of the loop formed by the loop parasitic resonator element 2350 is less than the width 2315 of the ground plane 510. While the width 2305, 2325, 2345 of each alternative loop parasitic resonator element 2310, 2330, 2350 differs, the effective electric length of each alternative loop parasitic resonator element 2310, 2330, 2350 is equivalent and each alternative loop parasitic resonator element 2310, 2330, 2350 is centered on the effective electric field mid-line 512.

Figure 24A:
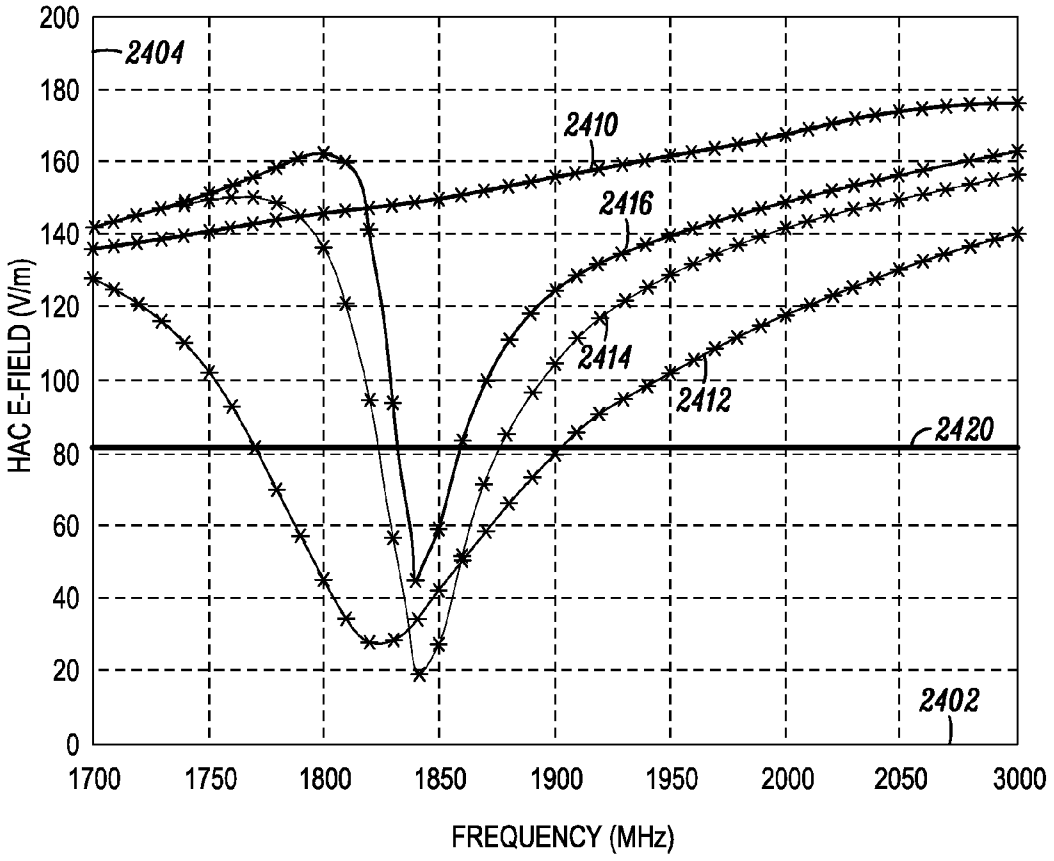
FIG. 24A is a graph of a free space electric field plot of the EM field mitigation system of the portable communication device of FIG. 2 in accordance with the alternatives of the third embodiment depicted in FIGS. 23A, 23B and 23C.
Figure 24B:
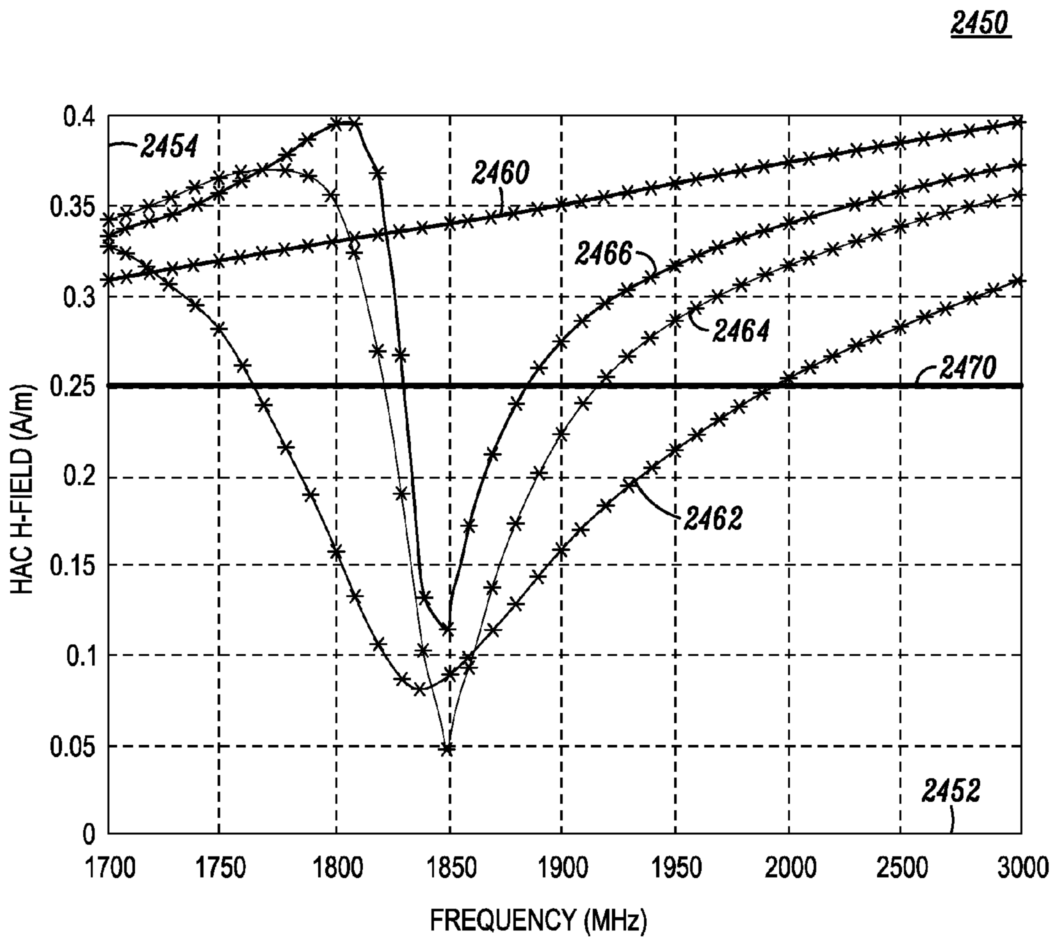
FIG. 24B is a graph of a free space magnetic field plot of the EM field mitigation system of the portable communication device of FIG. 2 in accordance with the alternatives of the third embodiment depicted in FIGS. 23A, 23B and 23C.

The effect of these alternative variations can be seen in FIGS. 24A and 24B. Referring to FIG. 24A, a graph 2400 of a free space electric field plot of the EM field mitigation system 202 in accordance with the three variations of the third embodiment is depicted. The frequency (in MHz) is plotted on the abscissa (i.e., the x-axis) 2402 and the electric field strength (in Volts per meter) is plotted on the ordinate (i.e., the y-axis) 2404. A reference curve for an antenna system with only a dipole antenna element 502 is shown on line 2410. The curve 2412 depicts the electric field of the EM field mitigation system 202 including the antenna element 502 and the loop parasitic resonator element 2310 in accordance with the first alternative of the third embodiment. The curve 2414 depicts the electric field of the EM field mitigation system 202 including the antenna element 502 and the loop parasitic resonator element 2330 in accordance with the second alternative of the third embodiment. And the curve 2416 depicts the electric field of the EM field mitigation system 202 including the antenna element 502 and the loop parasitic resonator element 2350 in accordance with the third alternative of the third embodiment. A reference line 2420 represents an upper limit of the M3 hearing aid compliant (HAC) electric field. The information in graph 2400 does not take into account any return losses. So, while the width 2305, 2325, 2345 of the loop parasitic resonator element 2310, 2330, 2350 in the variations of the third embodiment depicted in FIGS. 23A, 23B and 23C are different, it can be seen from the lines 2412, 2414 and 2416 that the additional resonance from the parasitic elements 2310, 2330, 2350 of the EM field mitigation system 202 in accordance with all variations of the third embodiment mitigates the electric field emissions to assist bringing the portable communication device 200 into hearing aid compliance without decreasing the power provided to transmissions from the portable communication device 200.

FIG. 24B depicts a similar graph 2450 of magnetic field strength of the EM field mitigation system 202 in accordance with the variations of the third embodiment. The frequency (in MHz) is plotted on the abscissa (i.e., the x-axis) 2452 and the magnetic field strength (in Amperes per meter) is plotted on the ordinate (i.e., the y-axis) 2454. A reference curve for an antenna system with only a dipole antenna element 502 is shown on line 2460. The curve 2462 depicts the magnetic field of the EM field mitigation system 202 including the antenna element 502 and the loop parasitic resonator element 2310 in accordance with the first alternative of the third embodiment. The curve 2464 depicts the magnetic field of the EM field mitigation system 202 including the antenna element 502 and the loop parasitic resonator element 2330 in accordance with the second alternative of the third embodiment. And the curve 2466 depicts the magnetic field of the EM field mitigation system 202 including the antenna element 502 and the loop parasitic resonator element 2350 in accordance with the third alternative of the third embodiment. A reference line 2470 represents an upper limit of the M3 hearing aid compliant (HAC) magnetic field. Similar to graph 2400 as stated previously in regards to FIG. 24A, the information in graph 2450 does not take into account any return losses. Even so, it can be seen from FIG. 24B that the additional resonance from the parasitic elements 2310, 2330 and 2350 of the EM field mitigation system 202 in accordance with the variations of the third embodiment depicted in FIGS. 23A, 23B and 23C mitigates the electric field emissions to assist bringing the portable communication device 200 into hearing aid compliance without decreasing the power provided to transmissions from the portable communication device 200.

Figure 25:
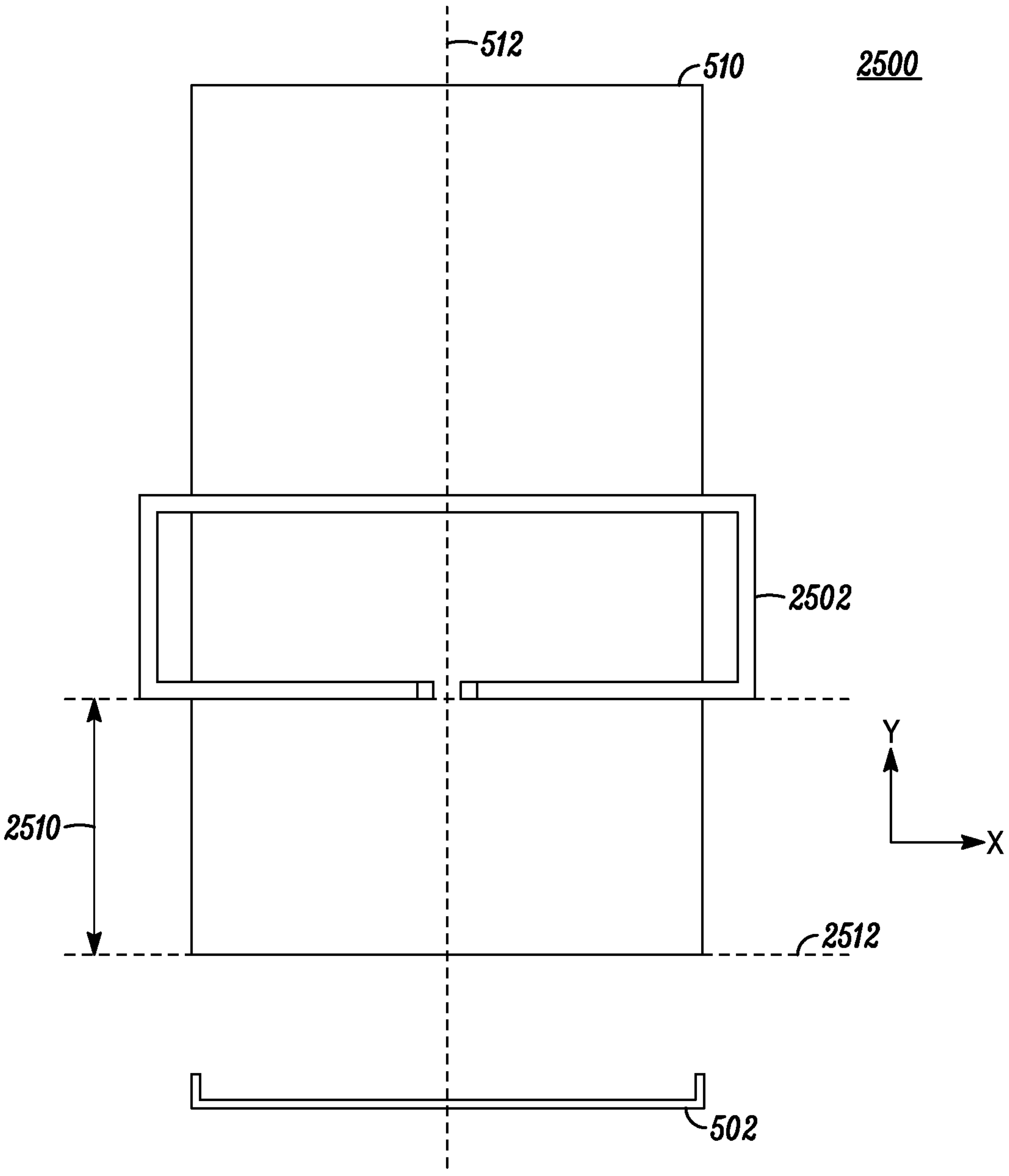
FIG. 25 is a rear planar view of an EM field mitigation system of the portable communication device of FIG. 2 in accordance with the third embodiment.
Figure 26A:
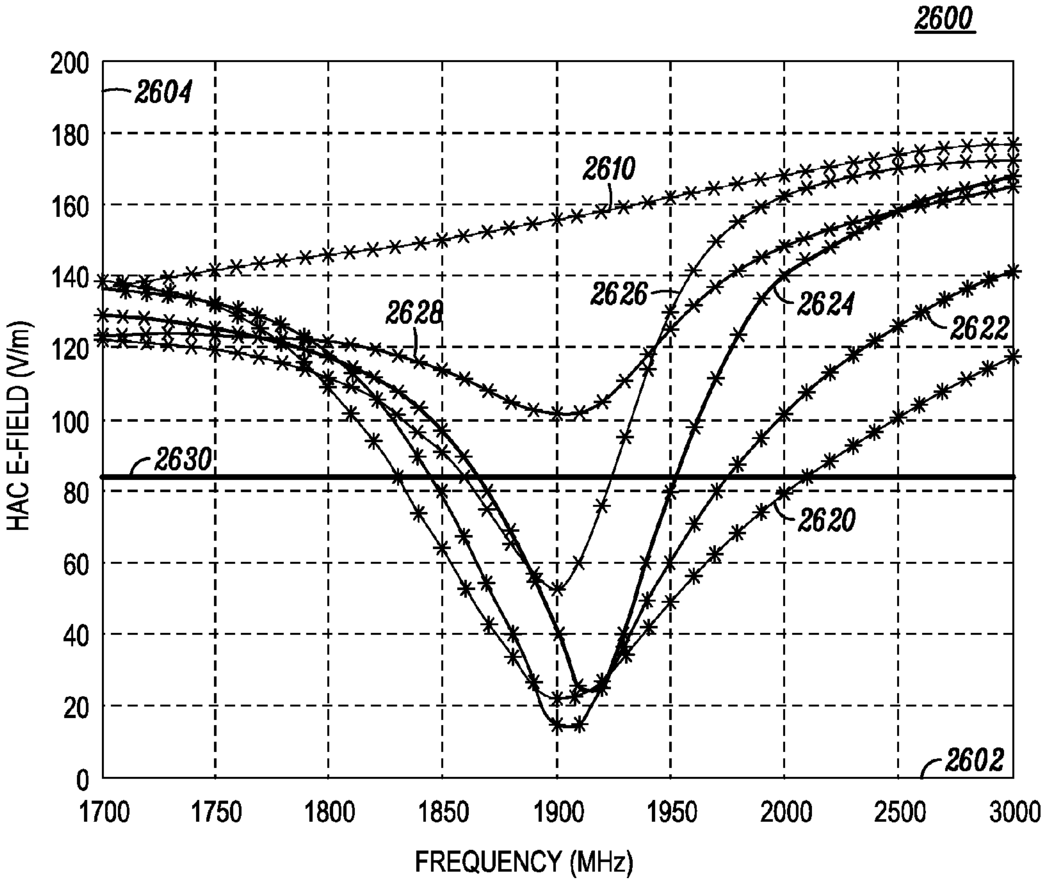
FIG. 26A is a graph of a free space electric field plot of the EM field mitigation system of the portable communication device of FIG. 2 in accordance with the third embodiment at various locations of the parasitic resonator element depicted in FIG. 25.

Placement of the loop parasitic antenna element 2502 in relation to the antenna element 502 can provide additional alternative variations of the EM field mitigation system 202 in accordance with the third embodiment. FIG. 25 depicts a rear planar view 2500 of the EM field mitigation system 202 in accordance with the third embodiment wherein the loop parasitic antenna element 2502 is located a distance 2510 from a bottom edge 2512 of the ground plane 510, the bottom edge 2512 of the ground plane being a reference for antenna system measurements. The effect of varying the distance 2510 can be seen in FIGS. 26A and 26B. Referring to FIG. 26A, a graph 2600 of free space electric field of the EM field mitigation system 202 in accordance with the third embodiment at various locations of the loop parasitic antenna element 2502 is depicted. The frequency (in MHz) is plotted on the abscissa (i.e., the x-axis) 2602 and the electric field strength (in Volts per meter) is plotted on the ordinate (i.e., the y-axis) 2604.

A reference curve for an antenna system with only a dipole antenna element 502 is shown on line 2610. The curve 2620 depicts the electric field of the EM field mitigation system 202 including the antenna element 502 and the loop parasitic resonator element 2502 in accordance with the third embodiment wherein the distance 2510 is zero. In other words, the loop parasitic resonator element 2502 is implemented on the bottom edge of the ground plane 510 nearest the antenna element 502. The curve 2622 depicts the electric field of the EM field mitigation system 202 including the antenna element 502 and the loop parasitic resonator element 2502 in accordance with the third embodiment wherein the distance 2510 is ten millimeters. The curve 2624 depicts the electric field of the EM field mitigation system 202 including the antenna element 502 and the loop parasitic resonator element 2502 in accordance with the third embodiment wherein the distance 2510 is twenty-five millimeters. The curve 2626 depicts the electric field of the EM field mitigation system 202 including the antenna element 502 and the loop parasitic resonator element 2502 in accordance with the third embodiment wherein the distance 2510 is forty millimeters. And the curve 2628 depicts the electric field of the EM field mitigation system 202 including the antenna element 502 and the loop parasitic resonator element 2502 in accordance with the third embodiment wherein the distance 2510 is fifty-five millimeters. A reference line 2630 represents an upper limit of the M3 hearing aid compliant (HAC) electric field. While the distance of the loop parasitic antenna element 2502 from the bottom 2512 of the ground plane 510 being between zero and forty millimeters provides mitigation of the electric field emissions of the EM field mitigation system 202 to assist bringing the portable communication device 200 into hearing aid compliance without decreasing the power provided to transmissions from the portable communication device 200 as seen in electric field values 2620, 2622, 2624, 2626, 2628 it can be seen from the graph 2600 that the effect of varying the distance 2510 to move the parasitic element 2502 closer to or further from the driven antenna 502 varies the mitigation of the electric field. Thus with a known frequency of interest, the distance can be predetermined to provide the optimal EM field mitigation for improved hearing aid compliance.

Figure 26B:
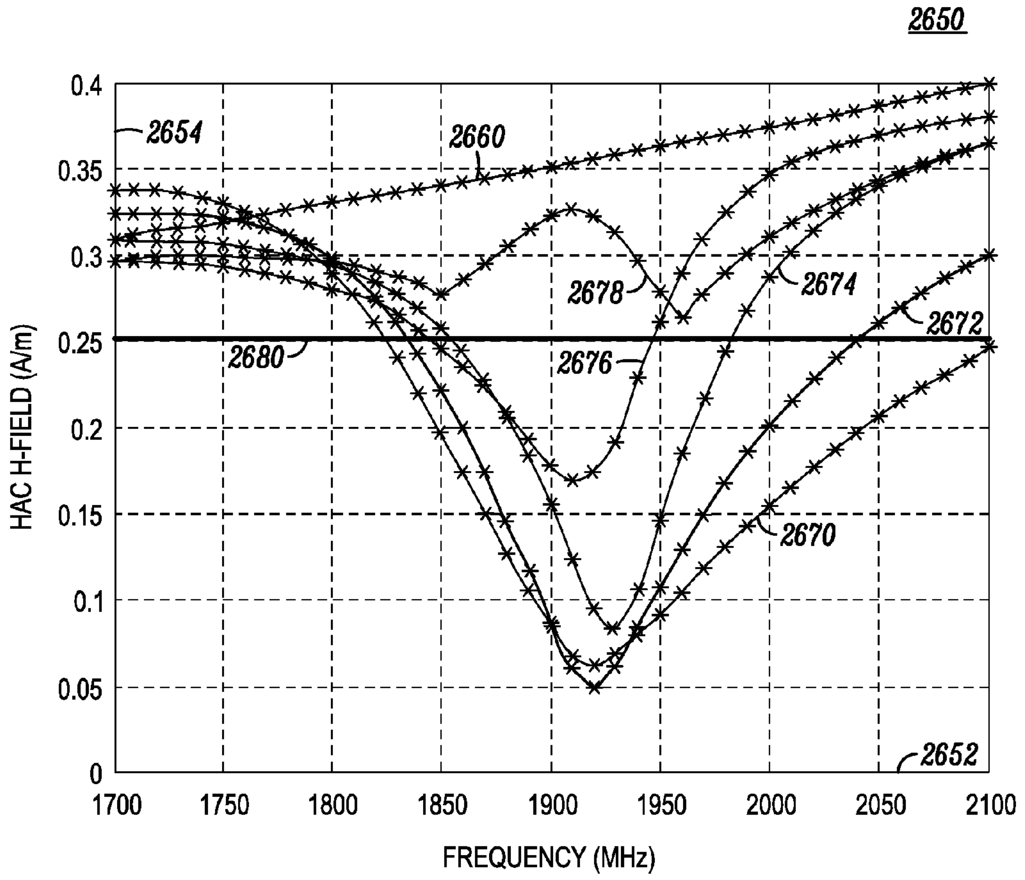
FIG. 26B is a graph of a free space magnetic field plot of the EM field mitigation system of the portable communication device of FIG. 2 in accordance with the third embodiment at various locations of the second element depicted in FIG. 25.

FIG. 26B depicts a similar graph 2650 of magnetic field strength of the EM field mitigation system 202 in accordance with the variations of the third embodiment. The frequency (in MHz) is plotted on the abscissa (i.e., the x-axis) 2652 and the magnetic field strength (in Amperes per meter) is plotted on the ordinate (i.e., the y-axis) 2654. A reference curve for an antenna system with only a dipole antenna element 502 is shown on line 2660. The curve 2670 depicts the magnetic field of the EM field mitigation system 202 including the antenna element 502 and the loop parasitic resonator element 2502 in accordance with the third embodiment wherein the distance 2510 is zero. The curve 2672 depicts the magnetic field of the EM field mitigation system 202 including the antenna element 502 and the loop parasitic resonator element 2502 in accordance with the third embodiment wherein the distance 2510 is ten millimeters. The curve 2674 depicts the magnetic field of the EM field mitigation system 202 including the antenna element 502 and the loop parasitic resonator element 2502 in accordance with the third embodiment wherein the distance 2510 is twenty-five millimeters. The curve 2676 depicts the magnetic field of the EM field mitigation system 202 including the antenna element 502 and the loop parasitic resonator element 2502 in accordance with the third embodiment wherein the distance 2510 is forty millimeters. And the curve 2678 depicts the magnetic field of the EM field mitigation system 202 including the antenna element 502 and the loop parasitic resonator element 2502 in accordance with the third embodiment wherein the distance 2510 is fifty-five millimeters. A reference line 2680 represents an upper limit of the M3 hearing aid compliant (HAC) magnetic field. The distance of the loop parasitic resonator element 2502 from the bottom 2512 of the ground plane 510 being between zero and forty millimeters provides mitigation of the magnetic field emissions of the EM field mitigation system 202 as seen in magnetic field values 2670, 2672, 2674, 2676, 2678 to assist bringing the portable communication device 200 into hearing aid compliance without decreasing the power provided to transmissions from the portable communication device 200.

Figure 27:
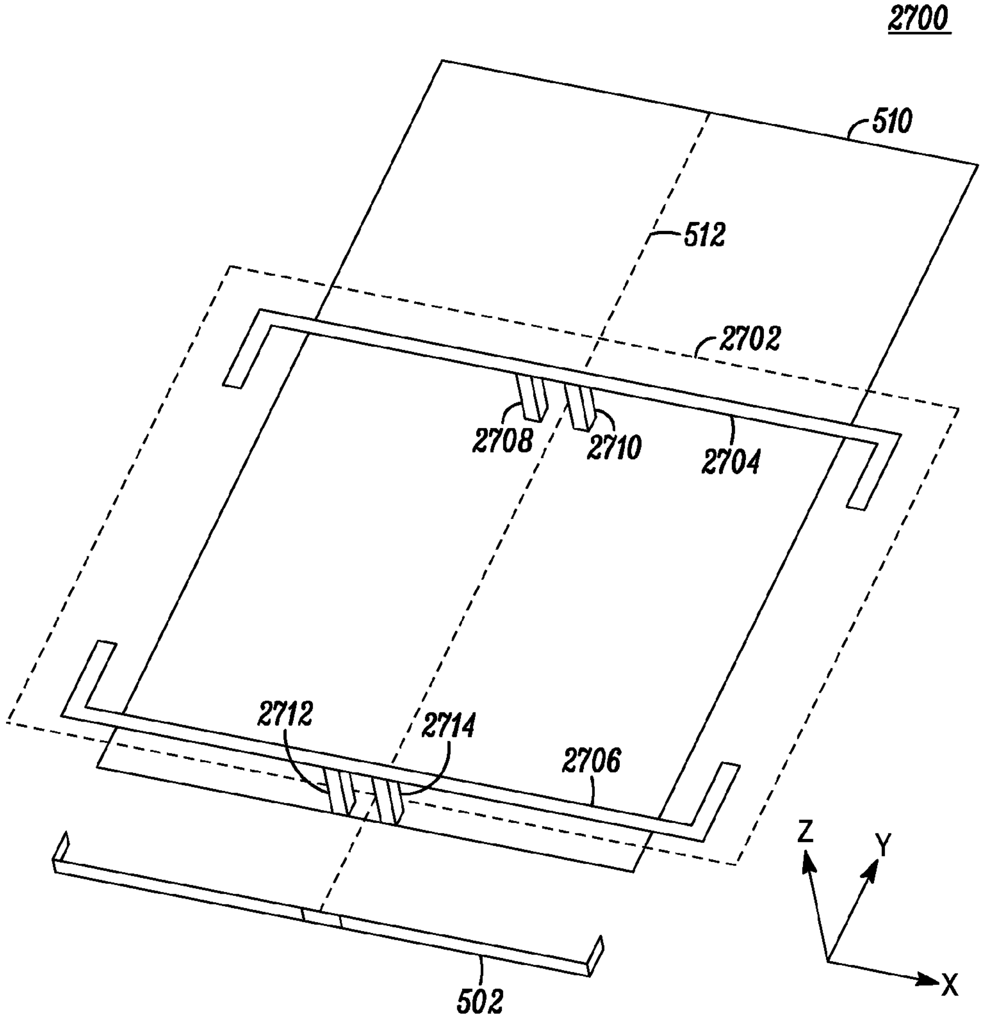
FIG. 27 is a rear bottom right perspective view of an EM field mitigation system of the portable communication device of FIG. 2 in accordance with a fourth embodiment.

An EM field mitigation system 202 which includes an antenna element 502 and dual parasitic resonators, as shown in FIG. 27, will provide a half wave resonance response instead of a full wave response (as, for example, the parasitic resonator 2502 of FIG. 25) or a quarter wave response (as, for example, the parasitic resonator 504 of FIG. 5). FIG. 27 is a rear bottom right perspective view 2700 of the EM field mitigation system 202 in accordance with a fourth embodiment, wherein the parasitic resonator element 2702 includes dual parasitic resonator elements including a first element 2704 having an arm length of approximately a half wavelength and a second element 2706 also having an arm length of approximately a half wavelength. The element 2704 is connected to the ground plane 510 through legs 2708 and 2710, one leg on each side of the effective electric field mid-line 512 as located laterally along the x-axis. The second element 2706 is also connected to the ground plane 510 through legs 2712 and 2714, one leg also on each lateral side of the effective electric field mid-line 512.

Figure 28:
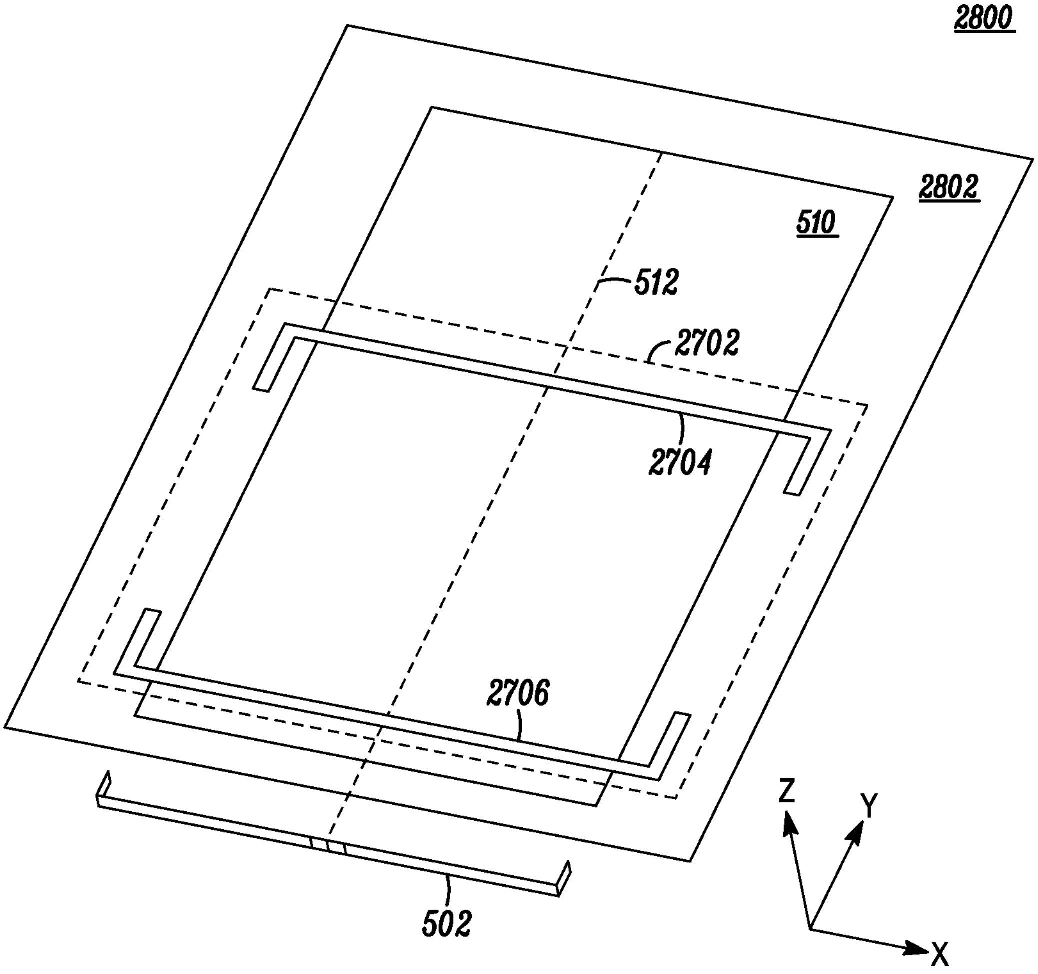
FIG. 28 is a rear bottom right perspective view of an EM field mitigation system of the portable communication device of FIG. 2 in accordance with a fifth embodiment.

FIG. 28 is a rear bottom right perspective view 2800 of the EM field mitigation system 202 in accordance with a fifth embodiment, wherein the parasitic resonator elements 2702 are dual parasitic resonator elements including the first element 2704 and the second element 2706, each of the first and second elements 2704, 2706 centered upon the effective electric field mid-line 512 as measured laterally in the x-axis direction and having a length of approximately a half wavelength. The EM field mitigation system 202 in accordance with this fifth embodiment differs from the EM field mitigation system 202 in accordance with the fourth embodiment in that the first element 2704 and the second element 2706 are traces floating above the ground plane 510 without any legs, such as half wavelength traces laid directly on a PCB 2802 and not connected to the ground plane 510.

Figure 29A:
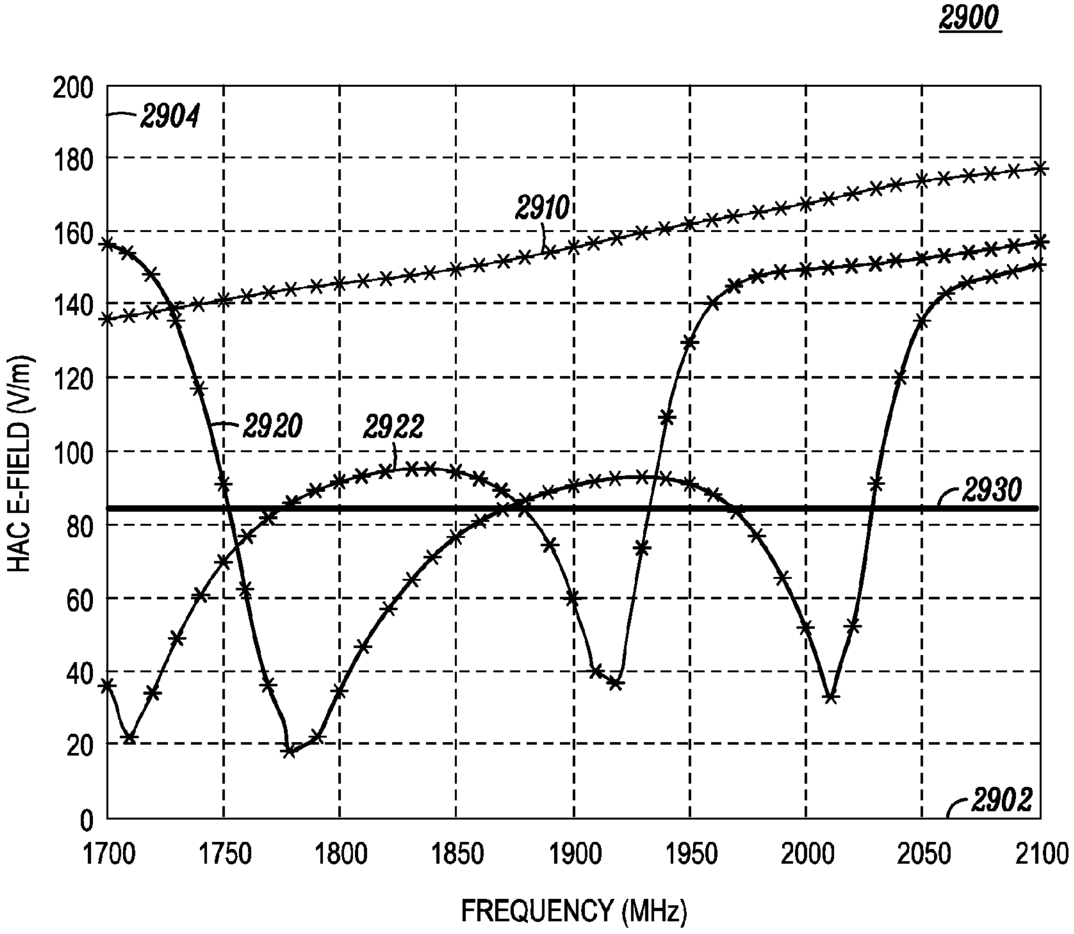
FIG. 29A is a graph of a free space electric field plot of the EM field mitigation system of the portable communication device of FIG. 2 in accordance with the fourth and fifth embodiments depicted in FIGS. 27 and 28.

Referring to FIG. 29A, a graph 2900 of a free space electric field plot of the EM field mitigation system 202 in accordance with the fourth and fifth embodiments is depicted. The frequency (in MHz) is plotted on the abscissa (i.e., the x-axis) 2902 and the electric field strength (in Volts per meter) is plotted on the ordinate (i.e., the y-axis) 2904. A reference curve for an antenna system with only a dipole antenna element 502 is shown on line 2910. The curve 2920 depicts the electric field of the EM field mitigation system 202 including the antenna element 502 and the dual parasitic resonator elements 2702 with legs in accordance with the fourth embodiment (FIG. 27). The curve 2922 depicts the electric field of the EM field mitigation system 202 including the antenna element 502 and the dual parasitic resonator elements 2702 in accordance with the fifth embodiment (i.e., no legs as depicted in FIG. 28). A reference line 2930 represents an upper limit of the M3 hearing aid compliant (HAC) electric field. The information in graph 2900 does not take into account any return losses. It can be seen from the curves 2920 and 2922 that the additional resonance from both the dual parasitic elements 2702 of the EM field mitigation system 202 in accordance with the fourth embodiment depicted in FIG. 27 (i.e., with legs) and the dual parasitic elements 2702 of the EM field mitigation system 202 in accordance with the fifth embodiment depicted in FIG. 28 (i.e., without legs) mitigate the electric field emissions to assist bringing the portable communication device 200 into hearing aid compliance without decreasing the power provided to transmissions from the portable communication device 200.

Figure 29B:
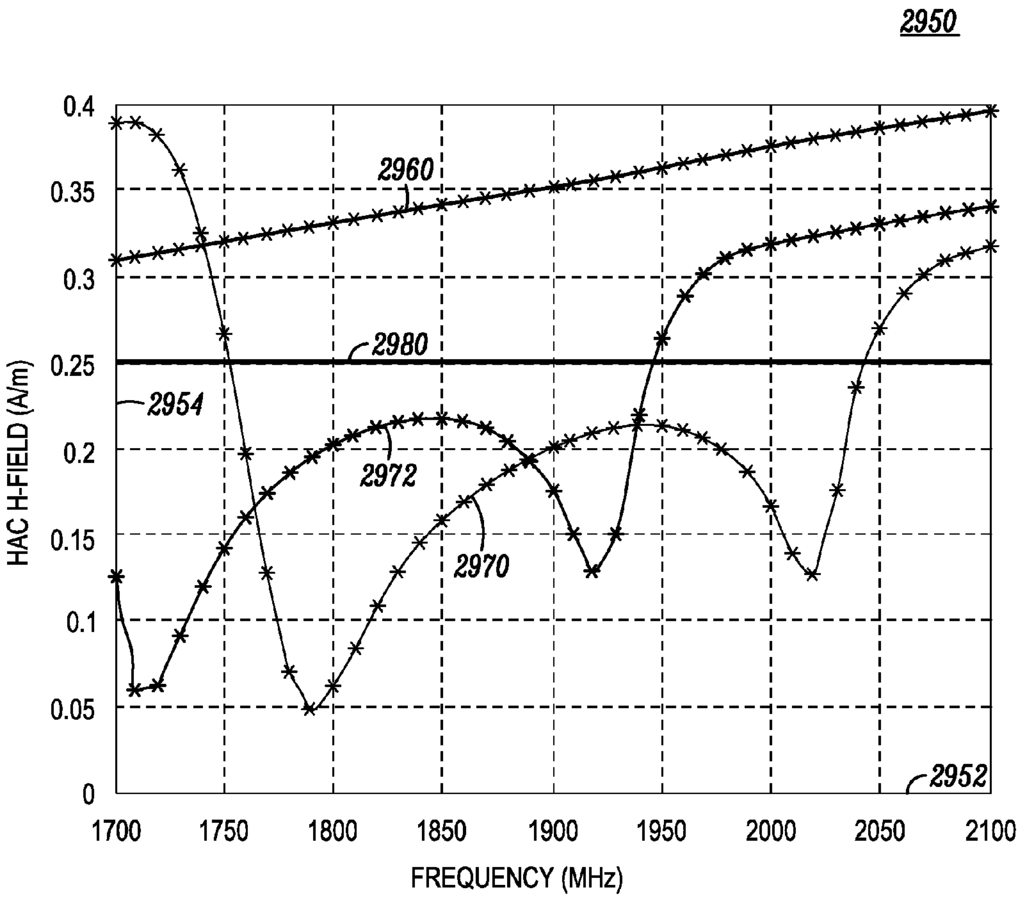
FIG. 29B is a graph of a free space magnetic field plot of the EM field mitigation system of the portable communication device of FIG. 2 in accordance with the fourth and fifth embodiments depicted in FIGS. 27 and 28.

FIG. 29B depicts a similar graph 2950 of magnetic field strength of the EM field mitigation system 202 in accordance with the fourth and fifth embodiments. The frequency (in MHz) is plotted on the abscissa (i.e., the x-axis) 2952 and the magnetic field strength (in Amperes per meter) is plotted on the ordinate (i.e., the y-axis) 2954. A reference curve for an antenna system with only a dipole antenna element 502 is shown on line 2960. The curve 2970 depicts the magnetic field of the EM field mitigation system 202 including the antenna element 502 and the dual parasitic antenna elements 2702 with legs in accordance with the fourth embodiment (FIG. 27). The curve 2972 depicts the magnetic field of the EM field mitigation system 202 including the antenna element 502 and the dual parasitic antenna elements 2702 in accordance with the fifth embodiment (i.e., no legs as depicted in FIG. 28). A reference line 2980 represents an upper limit of the M3 hearing aid compliant (HAC) magnetic field. The information in graph 2950 also does not take into account any return losses and the curves 2970 and 2972 demonstrate that the additional resonance from both the dual parasitic elements 2702 of the EM field mitigation system 202 in accordance with the fourth embodiment depicted in FIG. 27 (i.e., with legs) and the dual parasitic elements 2702 of the EM field mitigation system 202 in accordance with the fifth embodiment depicted in FIG. 28 (i.e., without legs) mitigate the electric field emissions to assist bringing the portable communication device 200 into hearing aid compliance without decreasing the power provided to transmissions from the portable communication device 200.

Figure 30:
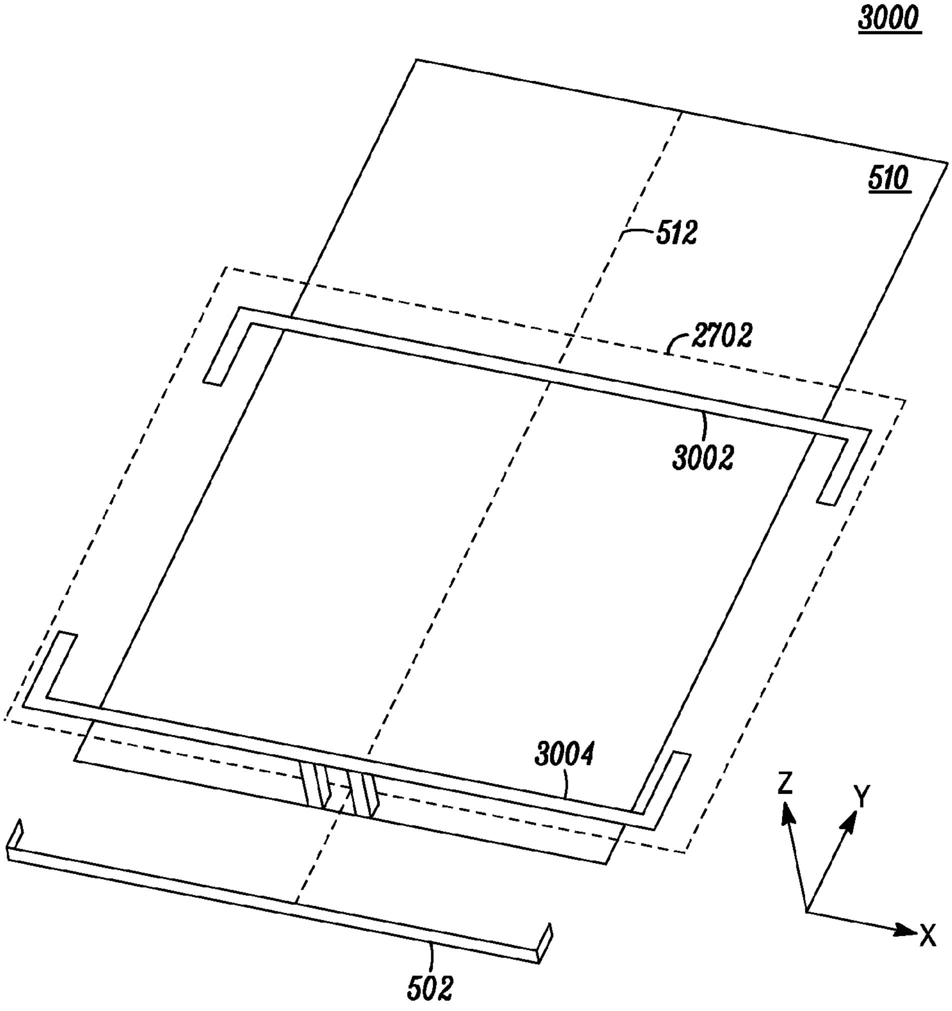
FIG. 30 is a rear bottom right perspective view of an EM field mitigation system of the portable communication device of FIG. 2 in accordance with a sixth embodiment.

FIG. 30 is a rear bottom right perspective view 3000 of the EM field mitigation system 202 in accordance with a sixth embodiment, wherein the parasitic resonator element 2702 is dual parasitic resonator elements including a first element 3002 and a second element 3004. The EM field mitigation system 202 in accordance with this sixth embodiment differs from the EM field mitigation system 202 in accordance with the fourth and fifth embodiments in that one of the portions of the dual parasitic resonator elements 2702 is connected to the ground plane 510 with legs straddling the effective mid-line 512 while the other one of the portions of the dual parasitic resonator elements 2702 floats above the ground plane 510 without any legs. While the view 3000 depicts the first portion 3002 floating above the ground plane 510 without any legs (e.g., a trace on a PCB not connected to the ground plane 510) and the second portion 3004 connected to the ground plane 510 via legs, the dual parasitic resonator elements 2702 in accordance with this sixth embodiment could also be constructed such that the first portion 3002 is connected to the ground plane via legs and the second portion 3004 floats above the ground plane 510 without any legs connecting it thereto.

Thus it can be seen that methods and apparati have been disclosed which advantageously provides an EM field mitigation for a portable communication device that produces mitigated electric field and magnetic field behavior near an earpiece thereof which can be used to assist in HAC. In this manner, a hearing aid compliant portable communication device is provided which mitigates electromagnetic emissions above the earpiece speaker without impacting efficient operation of the portable communication device's antenna system. While at least one exemplary embodiment has been presented in the foregoing detailed description of the invention, it should be appreciated that a vast number of variations exist.

In addition, in this document, relational terms such as first and second, top and bottom, and the like are used solely to distinguish one entity or action from another entity or action without necessarily requiring or implying any actual such relationship or order between such entities or actions. The terms "includes", "including", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "includes . . . a" does not, without more constraints, preclude the existence of additional identical elements in the process, method, article, or apparatus that comprises the element.

It will also be appreciated that embodiments of the invention described in this document may include one or more conventional processors or controllers and unique stored program instructions that control the one or more controllers to implement, in conjunction with certain non-controller circuits, some, most, or all of the functions of the portable communication device described (where the non-controller circuits may include an RF receiver and/or transceiver, clock circuits, power source circuits, and user input/output devices). As such, these functions may be interpreted as steps of a method to perform antenna tuning of the portable communication device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could also be used.

Thus, EM field mitigation systems for a portable communication device in accordance with the embodiments have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such EM field mitigation systems and portable communication devices including such EM field mitigation systems with minimal experimentation.

It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. An electromagnetic (EM) field mitigation system comprising:

a ground plane with an effective electric field mid-line laterally dividing the ground plane into a first side and a second side;

an antenna element coupled to the ground plane and resonating within at least one predetermined frequency band to generate EM field emissions for transmitting and receiving radio frequency (RF) signals modulated at one or more frequencies within the at least one predetermined first frequency band; and a parasitic resonator element located a predetermined distance from the antenna element including:

a first half-wavelength parasitic resonator portion without legs, floating above the ground plane, and crossing the effective electric field mid-line; and a second half-wavelength parasitic resonator portion without legs, floating above the ground plane, and crossing the effective electric field mid-line.

2. The EM field mitigation system in accordance with claim 1 wherein the antenna element comprises a differentially driven antenna element.

3. The EM field mitigation system in accordance with claim 2 wherein the differentially driven antenna element comprises a dipole differential antenna element.

4. The EM field mitigation system in accordance with claim 1 wherein the parasitic resonator element forms a loop parasitic resonator element for creating a full wave resonance within the at least one predetermined first frequency band.

5. The EM field mitigation system in accordance with claim 1 wherein the ground plane is an asymmetrically shaped ground plane and wherein the mid-line is determined in response to an inverse symmetry of electric fields measured over the ground plane.

6. A portable communication device comprising:

an earpiece speaker for generating audio signals and providing the audio signals as audible output therefrom;

a printed circuit board (PCB) for providing interconnection for elements of the portable electronic device and for establishing a ground plane for the portable electronic device;

an antenna element coupled to the ground plane and actively resonating within at least one predetermined frequency band for transmitting and receiving radio frequency (RF) signals modulated at one or more frequencies within the at least one predetermined frequency band, the antenna element comprising a differentially driven antenna element;

a parasitic resonator element located a predetermined distance from the antenna element including:

a first half-wavelength parasitic resonator portion without legs, floating above the ground plane, and crossing the effective electric field mid-line; and a second half-wavelength parasitic resonator portion without legs, floating above the ground plane, and crossing the effective electric field mid-line transceiver circuitry, coupled to the antenna element and the ground plane of the PCB, with transmitter circuitry for modulating signals for transmission from the antenna element as RF signals and receiver circuitry for demodulating RF signals received by the antenna element to generate demodulated signals; and a controller, coupled to the transceiver circuitry, for providing the signals to the transmitter circuitry for modulation thereby and for receiving the demodulated signals from the receiver circuitry, wherein the controller is also coupled to the earpiece speaker for providing signals to the earpiece speaker for generation of the audio signals.

7. The portable communication device in accordance with claim 6 further comprising a keypad located on a first side of the PCB, wherein the parasitic resonator element is located on the first side of the PCB and connected to the first side of the PCB for coupling to the ground plane established by the PCB.

8. The portable communication device in accordance with claim 6 further comprising a battery located on a second side of the PCB, wherein the parasitic resonator element is located on the second side of the PCB and connected to the second side of the PCB for coupling to the ground plane established by the PCB.

9. The portable communication device in accordance with claim 6 further comprising a housing for enclosing the earpiece speaker, the PCB, the antenna element, the parasitic resonator element, the transceiver circuitry, and the controller, wherein the housing is an unhinged structure.

10. The portable communication device in accordance with claim 6 further comprising a housing for enclosing the earpiece speaker, the PCB, the antenna element, the parasitic resonator element, the transceiver circuitry and the controller, wherein the housing is a hinged structure.

11. A portable communication device comprising:

a ground plane with an effective electric field mid-line laterally dividing the ground plane into a first side and a second side; and an electromagnetic (EM) field mitigation configuration comprising:

an active antenna element coupled to the ground plane and resonating within at least one predetermined frequency band for transmitting and receiving radio frequency (RF) signals modulated at one or more frequencies within the at least one predetermined first frequency band; and a passive parasitic resonator located a predetermined distance from the antenna element and including two separate half-wavelength parasitic resonator sections, each section crossing the mid-line, having a portion without legs, and floating above the ground plane.

12. The portable communication device in accordance with claim 11, wherein the predetermined distance enables the parasitic resonator to mitigate the near-field resonant pattern of the antenna element within certain Hearing Aid Compliant (HAC) measurement grids in a measurement plane centered above the earpiece speaker.

13. The portable communication device in accordance with claim 11, wherein the passive parasitic resonator has a predetermined shape, wherein the predetermined shape also enables the parasitic resonator to mitigate the near-field resonant pattern of the antenna element within certain Hearing Aid Compliant (HAC) measurement grids in a measurement plane centered above the earpiece speaker.

14. The portable communication device in accordance with claim 11, wherein the ground plane is an asymmetrically shaped ground plane and wherein the mid-line is determined in response to an inverse symmetry of electric fields measured over the ground plane.

* * * * *